United States Patent [19]

Engelbrecht et al.

[11] Patent Number: 5,912,917
[45] Date of Patent: Jun. 15, 1999

[54] DIGITAL BROADCAST SYSTEM

[76] Inventors: Lloyd Engelbrecht, 1405 Newport Spring Ct., Reston, Va. 22094; Leonard Schuchman, 11054 Seven Hill La., Potomac, Md. 20854; Ronald Bruno, 3203 N. 4th St., Arlington, Va. 22309

[21] Appl. No.: 08/073,442
[22] Filed: Jun. 8, 1993

Related U.S. Application Data

[63] Continuation-in-part of application No. 07/598,396, Oct. 18, 1990, Pat. No. 5,283,780.
[51] Int. Cl.$^6$ .................................................. H04B 7/02
[52] U.S. Cl. .................................................. 375/37
[58] Field of Search .................. 455/2, 3, 3.1, 6.3, 455/12, 13, 51.1, 51.2, 65; 375/1

[56] References Cited

U.S. PATENT DOCUMENTS

| | | | |
|---|---|---|---|
| 4,881,241 | 11/1989 | Pommier | 375/38 |
| 5,301,188 | 4/1994 | Kotzin | 370/50 |
| 5,303,393 | 4/1994 | Noreen | 455/2.3 |

Primary Examiner—Sandra O'Shea

[57] ABSTRACT

A digital broadcast system, comprising a master radio broadcast station located at a main predetermined location for formatting and broadcasting a plurality of channels of digitized program data in a spread spectrum, time and frequency hopping waveform to remote mobile and stationary receivers. A plurality of relatively low power range extension radio broadcast stations are provided, each said range extension station being located in selected areas and, each range extension station being adapted to receive and store one or more channels of program information from the master station. A separate program distribution system coupling the received and store of each range extension radio broadcast station with the master radio broadcast station, said separate distribution system, including, for each range extension station at least one path selected form satellite, microwave, fiber-optic, coaxial cable and telephone paths, for coupling one or more channels of program information to each range extension station. The channels of digital data re-broadcast from each of the range extension radio broadcast stations is synchronized with broadcasts from the master radio broadcast station such that a mobile receiver traveling between edges of reception of two or more low power range extension radio broadcast stations does not evidence interference therebetween.

26 Claims, 19 Drawing Sheets

|   | Segment A | Segment B | Segment C |
|---|-----------|-----------|-----------|
| I | 198 Bits  | 198 Bits  | 198 Bits  |
| Q | 198 Bits  | 198 Bits  | 198 Bits  |

| Type | ID |
|------|----|
| Compressed CD Stereo<br>L + T @ 96; KBS; IA + IB +IC<br>L - R @ 96; KBS; QA + QB +QC | .0 |
| Compressed CD Mono<br>CHA @ 96 KBS; IA + IB + IC<br>CHB @ 96 KBS; QA + QB +QC | .1<br>.2 |
| 4KHz Audio<br>CHA @ 64 KBS; IA + QA<br>CHB @ 64 KBS; IB + QB<br>CHC @ 64 KBS; IC + QC | .3<br>.4<br>.5 |

Example:

A "Talk" Show Program Desiring a Quality 4KHz Mono Channel Could Have A Channel ID of 85.3 with the ".3" Identifying the Receiver's Demulitplexing Process.

FIG. 13

Major Frame Length = 5,040 HOP Frame × 5.952381 × $10^{-3}$ $\frac{Sec}{HOP\ Frame}$ = 30 Seconds

| Number of Frequency Assignments Per HOP Frame | Integer Number of Minor Frames Per Major Frame |
|---|---|
| 1 | 5040 |
| 2 | 2520 |
| 3 | 1680 |
| 4 | 1268 |
| 5 | 1008 |
| 6 | 840 |
| 7 | 720 |
| 8 | 630 |
| 9 | 560 |
| 10 | 504 |
| 11 | NA: Install 12 |
| 12 | 402 |
| 13 | NA: Install 14 |
| 14 | 360 |
| 15 | 336 |
| 16 | 315 |
| 17 | NA: Use an 8 and 9 |
| 18 | 280 |
| 19 | NA: Use a 9 and 10 |
| 20 | 252 |
| 21 | 240 |
| 22 | NA |
| 23 | NA |
| 24 | 210 |
| 25 | NA |
| 26 | NA |
| 27 | NA |
| 28 | 180 |
| 29 | NA |
| 30 | 168 |

Increasing Improvement from Multipath
1 Freq Not Recommended (But Possible)

High Performance Operational Conditions

Excessive Transmit Power

Implement As Multiple Smaller Minor Frame Segments

FIG. 14

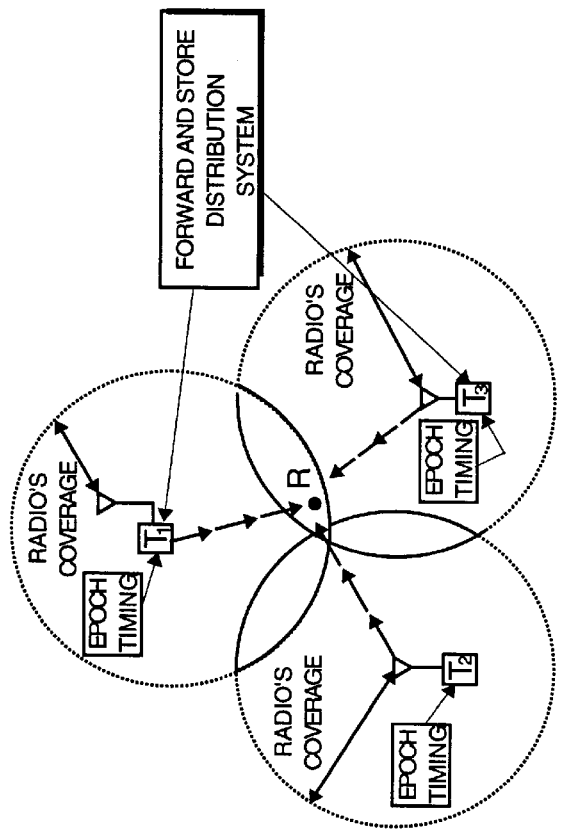
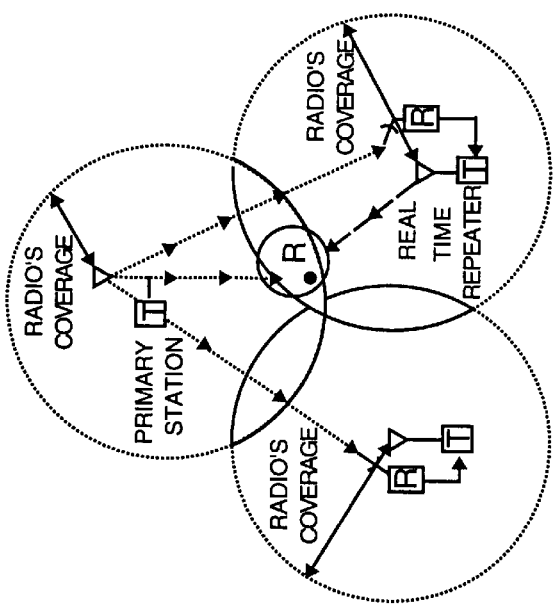
FIG. 19

DIGITAL BROADCAST SYSTEM

REFERENCE TO RELATED APPLICATION

This application is a continuation-in-part of Schuchman et al. application Ser. No. 07/598,396 filed Oct. 18, 1990, now U.S. Pat. No. 5,283,780 entitled "DIGITAL AUDIO BROADCASTING SYSTEM", which is incorporated herein by reference.

INTRODUCTION

This invention relates to a digital broadcast system. In a preferred embodiment, the system utilizes a digital transmission scheme to deliver compact disk (CD) quality program material to the listener and utilizes a unique transmission technique wherein many (possibly all) program channels are broadcast through each transmitter. Because of the distributed transmission system selected, low power transmitters can be used, and the desired range coverage is achieved through the use of range extension repeaters. The range extension repeaters additionally permit the coverage to be tailored to the population density, and reduces power wasted on low density areas (such as over oceans, lakes, etc.). The signals are distributed from the master station to the range extenders by a separate distribution system which can include satellite, microwave, fiber optic, coaxial cable and telco paths. All formatting is accomplished by the master station, and the extenders merely transmit the forwarded and stored data at the appropriate time. To prevent self-interference in the "seams" between the cells, the user's receiver preferably incorporates an adaptive equalizer to combine the identical signals from the multiple sources into the desired program channel data. To reduce the complexity of the adaptive equalizer, all transmissions from the transmitting sources are precisely timed using the global positioning system as a timing reference. Since all signals near the seams have approximately the same delay from a transmitter, and therefore the same digital data stream, the delay difference that the adaptive equalizer has to accommodate is small and technically economical. The VHF band, and specifically, the current FM band of 88 to 108 MHz is preferred for the introduction of the digital because of its superior propagation and penetration characteristics, and because of the RF technology developed for FM. An innovative transition approach is incorporated that permits flexible simultaneous use of the band by DAB and FM to permit graceful introduction of the system.

BRIEF DESCRIPTION OF THE DRAWINGS

The above and other objects, advantages and features of the invention will become more apparent when considered with the following specification and accompanying drawings wherein:

FIG. 13 is an example of the flexible use of the program data channels, FIG. 14 is an example of the design or definition of a major frame, FIG. 19 illustrates the seamless zone or cell transition according to the invention, FIG. 20 (left and right) illustrate the dynamic range reduction and bandwidth improvement according to the invention.

DETAILED DESCRIPTION OF THE INVENTION

While the invention has broad application to digital broadcasting systems generally, as do some of the advances in the art disclosed herein, the preferred embodiment is directed to digital audio broadcasting systems.

Key signal design approaches have been utilized to achieve a high quality transmission system. Most CD systems require approximately 1.5 megabits per second to deliver their high quality sound. This data rate would be prohibitive for radio transmission occupying many times the bandwidth of current FM signals. Therefore, data compression—and—expansion techniques are used to minimize the audio redundancy, and substantially reduce the data rate required. As a result, transmission bandwidth is reduced, multipath intersymbol interference is reduced (longer data bits relative to multipath delay), and less power is required for the transmission system. Because transmission errors will occur, convolutional encoding and Viterbi decoding are employed to reduce the effect of random transmission path errors. Transmission errors are typically incurred in bursts, and this system is designed to mitigate those burst errors. Data interleaving and deinterleaving is utilized to restructure the error distribution from burst to random in order that the convolutional encoding and decoding processes can operate on randomly distributed errors. The modulation approach can have a significant influence on the power and bandwidth required for the system, and quadrature phase shift keying is preferred because of its excellent power and bandwidth efficiency. The transmission media induces multiple paths (multipath delay) between the transmitter and receiver. Since the effect of this phenomena can vary significantly depending on the listener's speed, a frequency hopping technique is utilized which reduces the variable error statistics incurred into a highly manageable set acting upon a well-known hop rate and statistical distribution.

Figure 3:
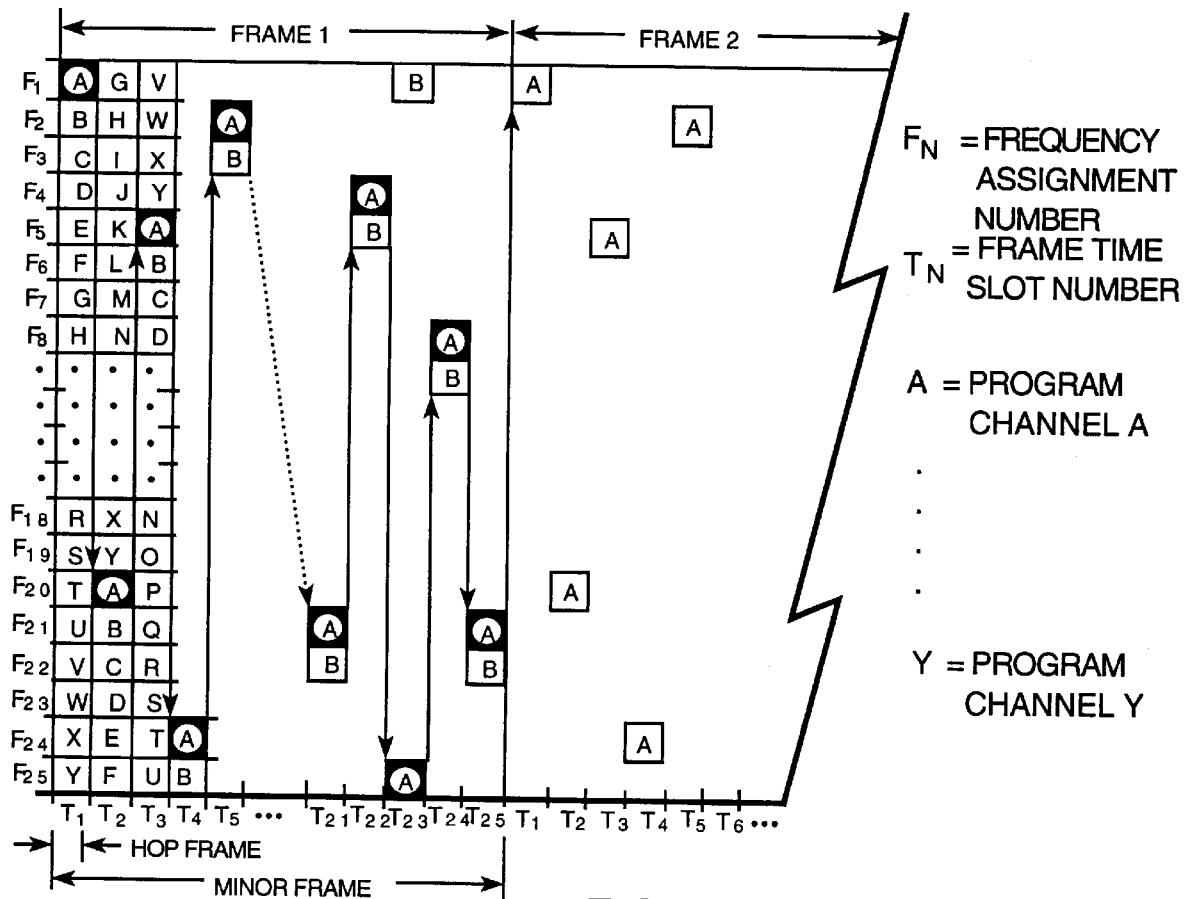
FIG. 3 is an illustration of the waveform for time and frequency hopping disclosed in U.S. patent application Ser. No. 07/598,396, now U.S. Pat. No. 5,283,780.

The waveform is disclosed in the above-identified application and is comprised of a time and frequency hopping scheme as shown on FIG. 3. A given program channel's data is transmitted over a selected frequency during one hop frame. In FIG. 3, "A" represents program data for channel A and is transmitted on frequency 1 during time slot T1. During the next interval, the program channel for A is transmitted on a new frequency (in the example, on frequency 20). This process continues until all the frequencies in the set have been utilized, at which time the process begins again. "A" through "Y" represent a group of program channels that are transmitted by this frequency hopping technique.

The object of the hopping scheme is to insure that no channel to a listener remains in a multipath "null". Statistically only a few of the frequencies will be in a poor signal-to-noise condition induced by the "null". Errors will be caused when a signal is hopped to a time-frequency cell having a poor signal-to-noise ratio condition, but the companion interleaving and deinterleaving process (which converts burst errors to random errors) coupled with the convolutional coding and Viterbi decoding process (which eliminates most random errors) reduces the effect of the occasional errored burst. Because each program channel is hopped over a bandwidth many times the bandwidth of the individual program, the system is a spread spectrum process wherein the processing gain to interference is equal to the number of frequency slots in the waveform. Thus it is possible that interference on a particular slot can be totally overcome by the hopping/interleaving/coding process. Therefore, N program channels occupy only N times their individual bandwidth, but experience the spread spectrum gain as if each channel had a bandwidth of N times its individual bandwidth by itself.

THE INTERLEAVING AND DEINTERLEAVING PROCESS

Figure 2:
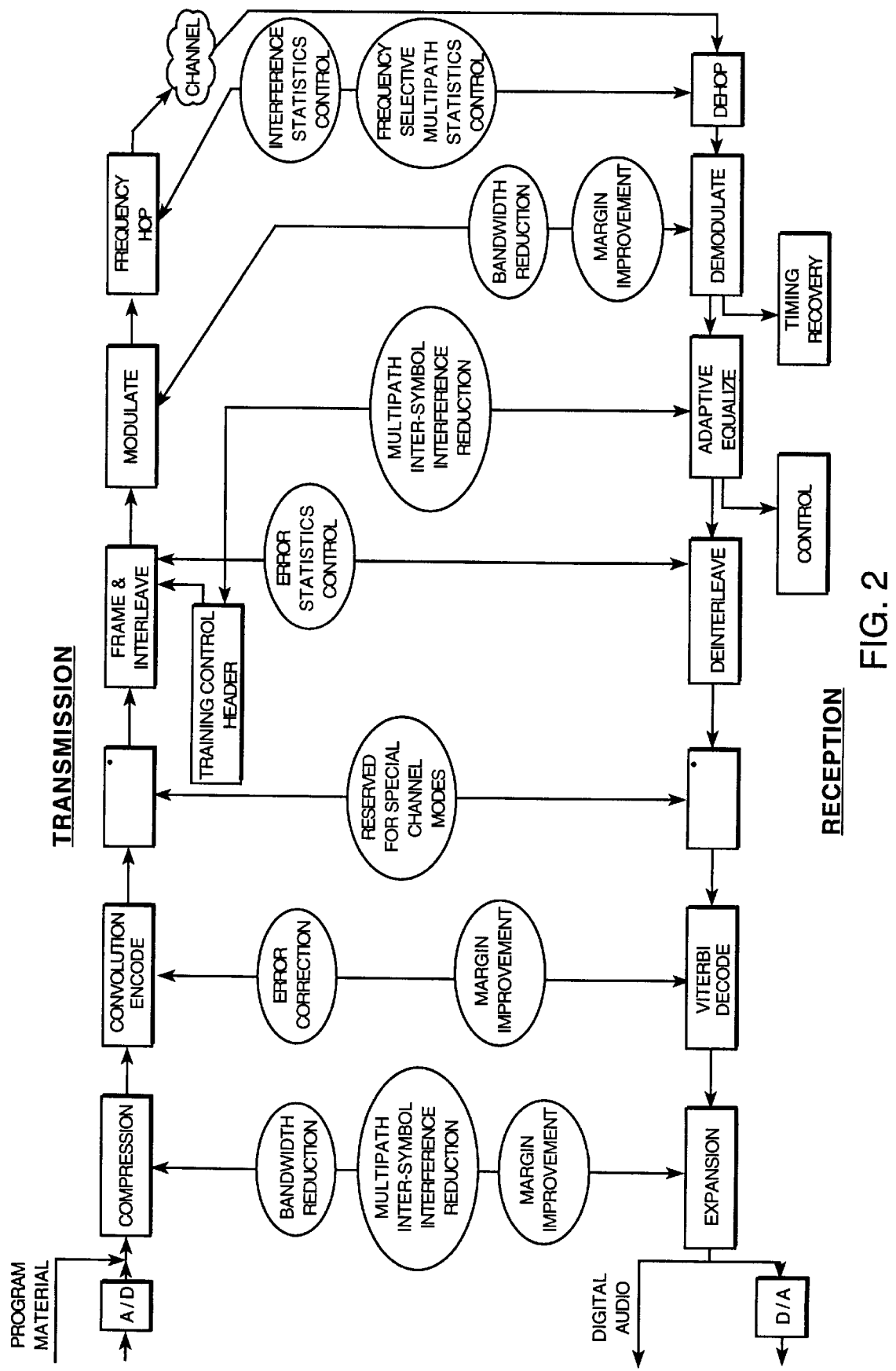
FIG. 2 is a schematic illustration of a digital audio broadcast communication process of the type shown in U.S. patent application Ser. No. 07/598,396, now U.S. Pat. No. 5,283,780.
Figure 4:
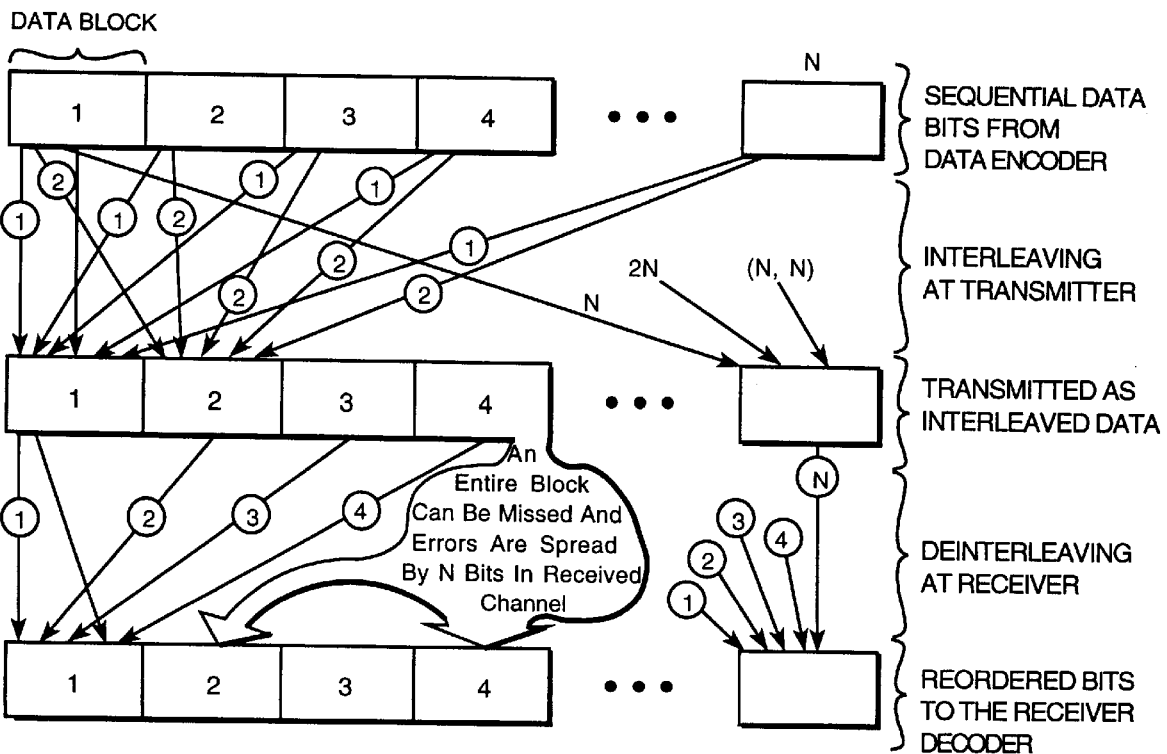
FIG. 4 is a schematic illustration of the interleaving and deinterleaving process shown in U.S. patent application Ser. No. 07/598,396, now U.S. Pat. No. 5,283,780.

In FIG. 4, data blocks are developed that include the data in the order in which it was generated. If transmitted unaltered, bursts of errors could corrupt pieces of the data, reducing the quality of the sound at the receiver. To reduce the effect of burst errors, data from block 1 is redistributed into N new blocks. Similarly, data from block 2 is redistributed, block 3 is redistributed, etc. until all the blocks are reallocated. The reordered blocks are then transmitted. At the receiver, the process is reversed in that only one bit from each transmitted block is placed in each receive block. Therefore, if a transmitted block is lost (i.e., a burst error), each received and reordered data block has to cope with one error. This task of removing the effect of these separated randomized errors is the purpose of the convolutional decoder shown in FIG. 2. The description shown is for a "square" interleaver matrix wherein the number of bits per block and the number of blocks are the same. There are many other types of interleavers, and this example was chosen for ease of description.

THE HOP FRAME ORGANIZATION

Figure 5:
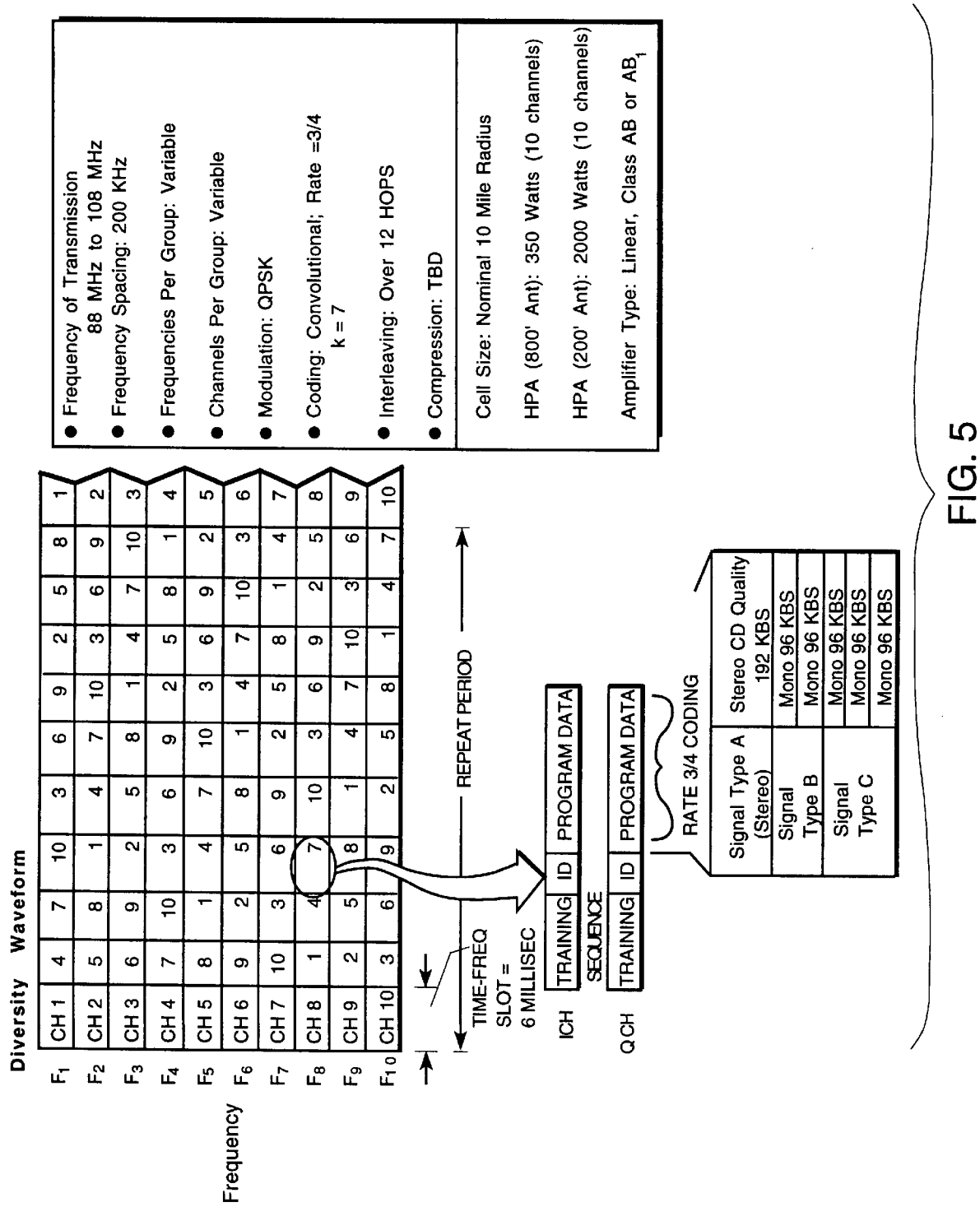
FIG. 5 shows a typical time/frequency matrix used by the waveform.
Figure 6:
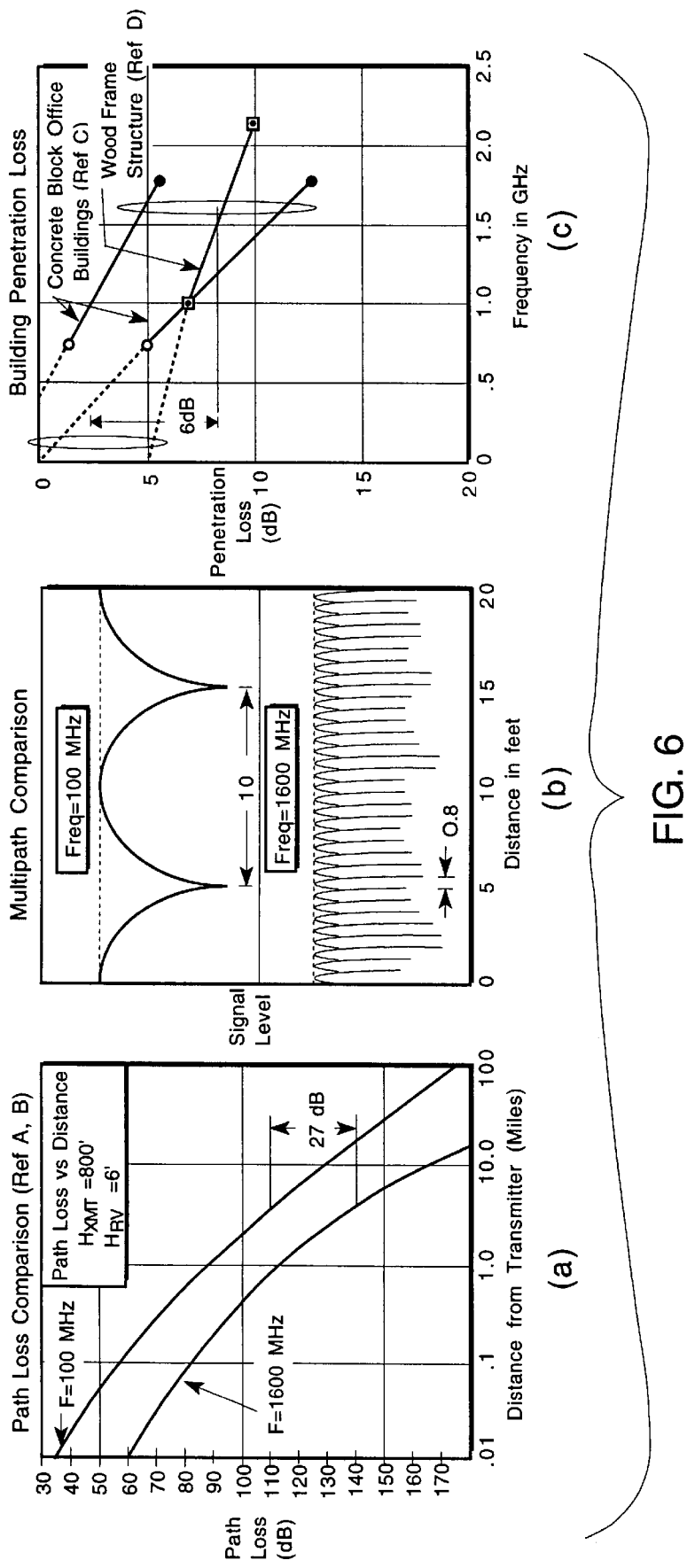
FIGS. 6a, 6b and 6c are graphs illustrating key system architecture selection (frequency band of operation), FIG. 7 diagrammatically illustrates an embodiment of the frequency and channel allocations.

A typical time frequency matrix used by the waveform is shown in FIG. 5. One particular hop frame is further expanded to show the contents of the time slot. Two signal paths are developed for parallel transmission on a quadrature phase shift keyed (QPSK) signal. One path is identified as the I (in-phase) channel and the other as the Q (quadrature) channel. Each contains separate data. Each channel provides a "training sequence" and a channel identification (ID) header. This information is followed by the program data. The training sequence is always the same sequence of symbols for each hop frame and for all hop frames regardless of the program channel. This sequence is used by the adaptive equalizer (see FIGS. 2 and 27) to adapt itself to the channel conditions based on an absolutely known sequence of information. The ID portion of the transmission is used by the receiver to synchronize itself to the time-frequency (TF) matrix, and select the specific channel desired. The combination of the I and Q channel permits the transmission of 192,000 bits per second required for the compressed CD program data (96,000 bits per second per monophonic channel). This channel capacity can also be used to transmit two monophonic CD quality channels, each belonging to a different program (broadcaster). Additionally, the 192,000 bits per second capacity can be reallocated to three 64,000 bit per second channels each belonging to a separate program source (broadcaster). This latter capability provides excellent quality audio similar to trunk telephone, and is substantially better than current quality on most AM broadcasts. This latter service is especially applicable to program materials consisting mostly of oral speech such as "talk" shows while maintaining good quality for musical commercials, etc. It is possible therefore, with the waveform organization utilized, that more programs of differing quality can be used over the waveform at a commensurate reduction in cost due to "waveform sharing".

The table in the box to the right of the diversity waveform summarizes the preferred transmission approach.

I. USE OF THE WAVEFORM AND ITS INTERACTION WITH THE FREQUENCY PLAN, TRANSITION FLEXIBILITY, AND CAPACITY FLEXIBILITY

A. THE FREQUENCY BAND OF OPERATION:

Numerous frequency bands have been suggested for the deployment of digital audio broadcast (DAB), the most popular being L-band and VHF (the current FM band). Comparison of the two bands with regard to propagation loss shows that nearly a thousand times the power is required at L-band than at VHF. While the DAB system described in this document is significantly more efficient than the current FM approach, the system penalty for operation at the high path loss is too severe. Additionally, the second figure shows the multipath "standing wave" that can be experienced at the two frequencies. Since the distance between nulls is 16:1 for the VHF band over L-band, the channel must change very little (i.e., be quasi-static) over the hop frame for which the training sequence has equalized the channel is evident that there is an enormous advantage of operating at VHF. Finally, broadcast radios must operate in a variety of locations including inside buildings and offices. From the projection of data found regarding the penetration losses for signals having to pass through walls etc., there appears to be a large advantage for the VHF band. As a result of these comparisons, it was decided that the VHF is the most appropriate band to operate, and specifically, the 88 to 108 MHz FM band was chosen. No new band of frequencies is required for the transition process. This selection of the FM band of course requires a planned transition approach and a highly flexible frequency utilization scheme to utilize "empty" FM assignment slots for the DAB. We have such a plan.

Figure 7:
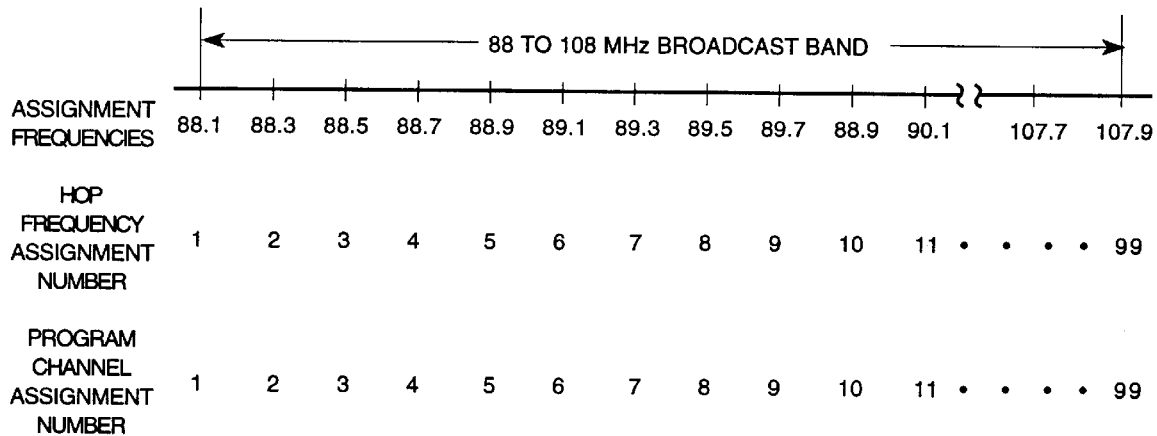

B. THE FREQUENCY AND CHANNEL ASSIGNMENT PLAN:

FIG. 7 shows the 88 to 108 MHz FM band. Current FM assignments are (within the NA continent) on the odd 100 KHz frequency slots. Preferably the DAB of this invention will utilize the same frequency spacing and assignments. For simplicity, the frequency slots are numbered 1 through 99, the currently available assignment quantity in a given geographical area. For convenience, the channels are also numbered 1 through 99; however, for this frequency hopping DAB system one-for-one association between the frequency number and the channel number is meaningless (because a program hops over numerous frequencies), unless the association is made at a specific time. Preferably the frequency ID and the channel ID are the same at the beginning of a minor frame (to be described), and at the beginning of a major frame which occurs every 30 seconds. FIG. 7 therefore shows the snapshot of the start of a minor or major frame. Since digital radio "hops" over many frequencies, the convention adopted is that a channel (program) ID and frequency in use are guaranteed to match at the start of every minor and every major frame (30 seconds), which is the condition shown in FIG. 7.

Figure 8:
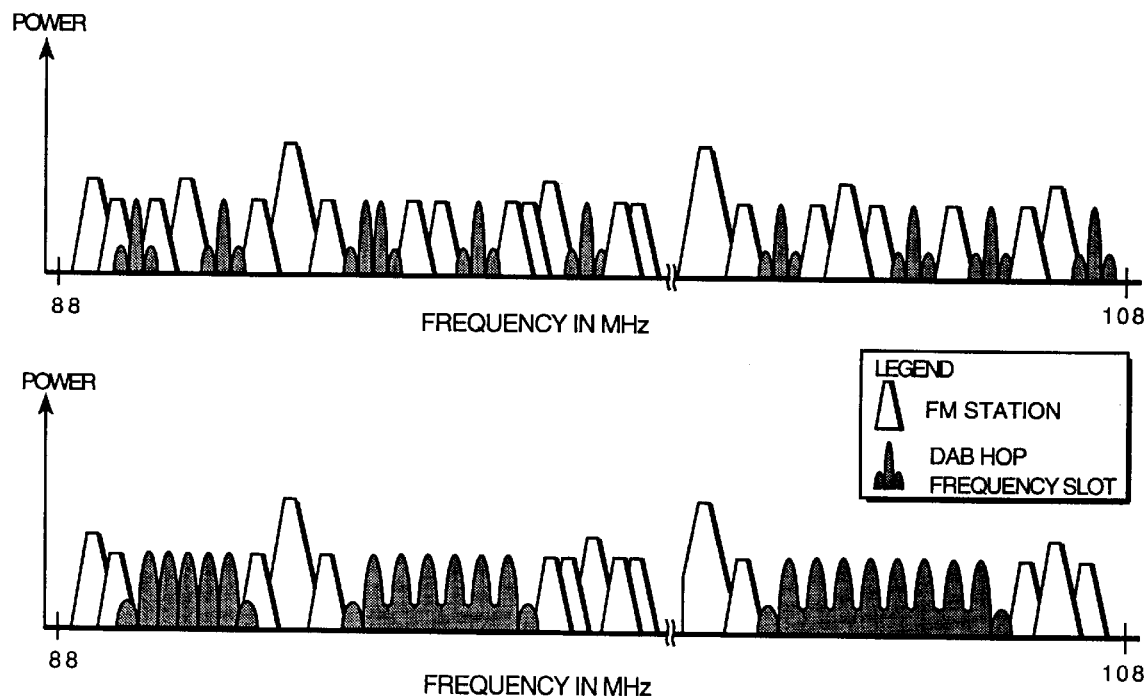
FIG. 8 illustrates the transition plan (a) an example in the initial implementation, and (b) an example in a later phase implementation of the transition.

C. THE TRANSITION APPROACH:

FIG. 8 depicts the intermingling of the DAB frequency assignments and the FM station assignments. During the transition (FIG. 8a), both systems will be able to use the band, although there will be some constraints regarding dynamic range and how closely the analog FM and digital DAB channels can be spaced as a function of the power of the FM station. As will be shown, these DAB frequencies can be in any frequency location and be used in any order. Additionally, the listener does not need to know anything about the hop process. As far as the listener is concerned, it appears that no hopping is taking place. The DAB system of this invention performs at its best when adjacent channels are also digital channels at the same power. Therefore, to achieve the best performance, as DAB is accepted, and FM programming begins to shift to DAB, there should be a concerted effort to group DAB signals as shown in FIG. 8b. Again, grouping is totally flexible and arbitrary, however, grouping does increase the performance primarily because of the decreased dynamic range the DAB receiver will see because the DAB transmitted signals emanate from fewer transmitters.

Figure 9:
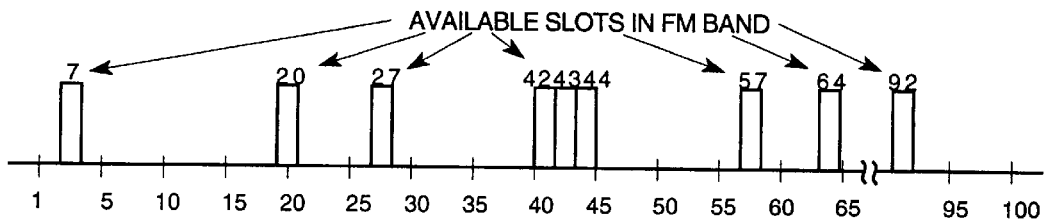
FIG. 9 is an example of a variable hop frequency assignment approach.

D. HOW THE FLEXIBLE FREQUENCY ASSIGNMENT SYSTEM WORKS:

The attached example in FIG. 9 shows the 88 to 108 MHz band with nine frequency slots assigned. Since the number of program channels can change from time-to-time, a different number of frequencies would be used. How is the flexible assignment process made independent of the listener? This process is accomplished by transmitting the sequence to the listener's radio so that the sequence can be electronically memorized. The particular approach selected in the preferred embodiment is very simple, highly immune to error, and can be altered at any time. On each hop, the transmitter tells the receiver where the next frequency hop will be. The receiver follows the instructions, memorizing each hop as it occurs. After the same sequence has been received numerous times, the sequence is stored, and the receiver thereafter hops to the stored memory to prevent hopping to a wrong frequency due to a transmission error. The receiver continues to compare the stored sequence with the current transmitted sequence. A consistent disagreement means that the assignment scheme has changed or the listener has changed to a different frequency group. The receiver then proceeds with the memorization process. This process is utilized each time the receiver is turned "on" or the above conditions prevail. The memorization period is less than 100 milliseconds. Because the receiver can adapt so rapidly to assignment changes, it is possible for numerous frequency groupings to exist simultaneously and be intermingled in their frequency assignments as long as each frequency assignment belongs to only one group.

Figure 10:
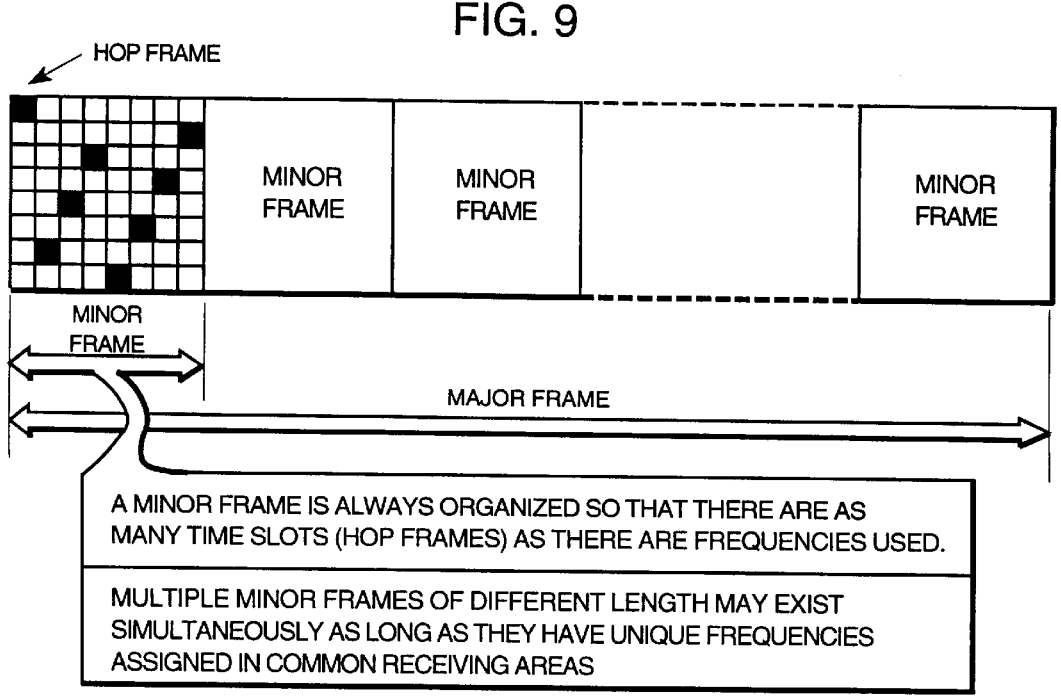
FIG. 10 is an example of the frame organization.

E. ORGANIZING THE FRAME STRUCTURE FOR FLEXIBLE ASSIGNMENTS:

The frame organization is shown in FIG. 10. The hop frame is the smallest segment of framing and is characterized by the time a program channel stays on one frequency. As will be shown, this period of time is approximately 6 milliseconds, and has been chosen primarily to permit high quality channel delivery in vehicles moving through a multipath environment at 60 mph. During that interval, the channel appears "quasi-stationary" to the adaptive equalizer incurring a multipath phase shift or less than 20 degrees. The next frame element has been named a minor frame. This frame changes length (time) depending on the number of program channels in the group. Since the number of program channels in the group always has an equal number of frequencies, and all frequencies are used in the hop pattern, the minor frame is as long as the number of program channels. The next framing element is called a major frame, and its length is 5040 hop frames. The start of a major frame occurs every 30 seconds on the minute epoch and 30 second epoch. This timing standardization is required to prevent range extenders from transmitting at the wrong time, and to match synchronization between the hop timing and the interleaver timing.

Figure 11:
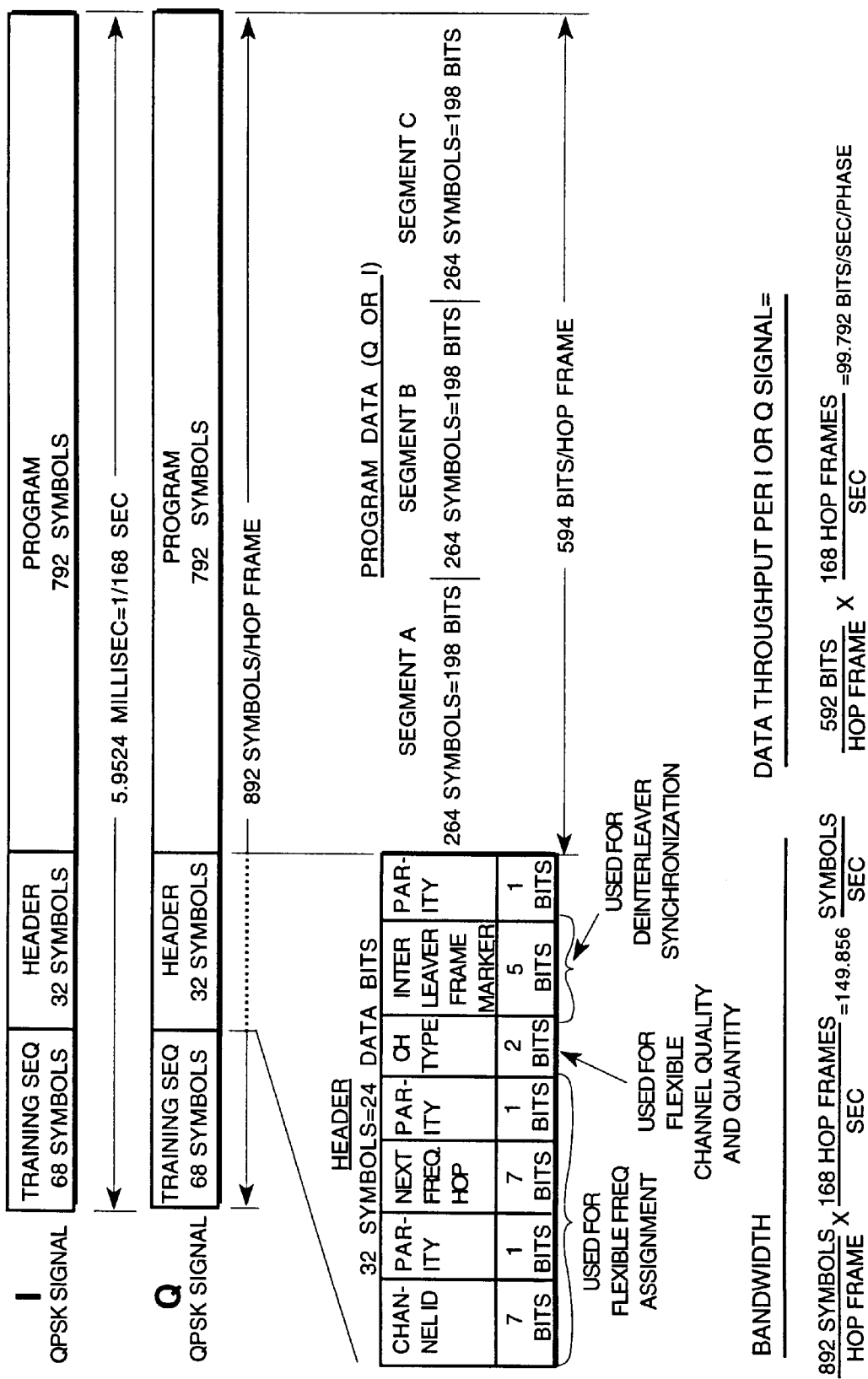
FIG. 11 is an example of the hop frame definition or expansions.

F. THE HOP FRAME:

In the disclosed embodiment, the channel capacity has been selected to transmit a compressed CD quality stereo program at 192,000 bits per second. To accomplish this capacity, QPSK has been selected and is preferred because of its bandwidth efficiency and power efficiency. QPSK has two channels for data transmission, one called the "I" channel, the second the "Q" channel. FIG. 11 shows the information content of these two channels. Each channel transmits a 68 symbol training sequence which is the same from hop-to-hop and for all channels. The training sequence is therefore a known pattern for every receiver for every program channel. The header includes 24 bits of data encoded to 32 symbols for error detection. The header data includes the channel ID, parity, next hop frequency ID, parity, channel type designation, a 5 bit interleaver frame marker, and parity. Error detection coding is included because the header channel must operate prior to the deinterleaving and Viterbi decoding. While the header segment will encounter a higher error rate than the data channels, the redundancy is so high, and the changes so infrequent, that the resultant information transfer is nearly errorless.

The data portion of the hop frame consists of 594 bits rate ¾ convolutionally encoded to 792 symbols in each of the I and Q channels. The frame structure results in 892 symbols being transmitted in 1/168 second producing a bandwidth requirement cf 149,856 symbols per second. Additionally, 594 bits are transmitted 168 times a second resulting in a data throughput rate of 99,792 bits per second per I or Q channel. Since 96,000 bits per second are required in this embodiment, the ability to rate buffer the program channels can be implemented if needed.

Figure 12:
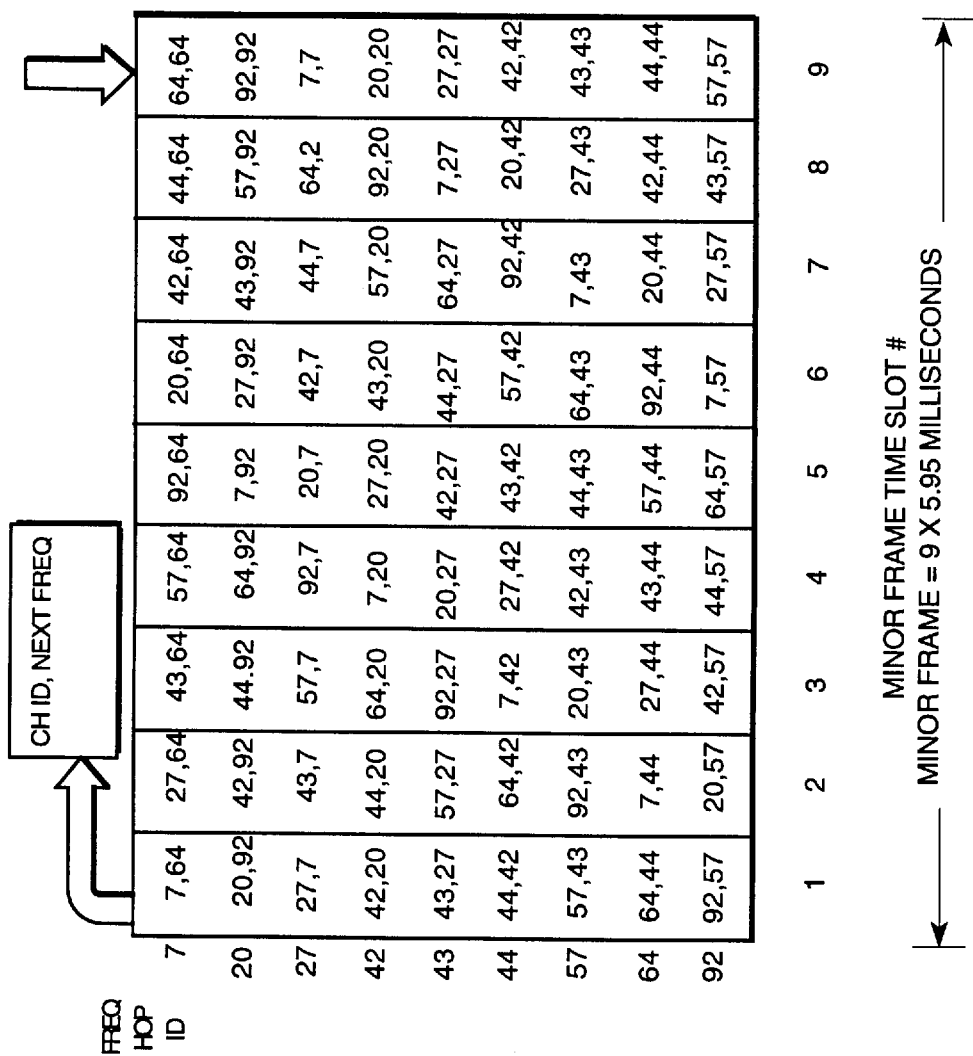
FIG. 12 is an example showing frame hop synchronization.

G. PROGRAM CHANNEL SELECTION WITH A FREQUENCY HOPPING SYSTEM:

FIG. 12 shows a minor frame with 9 program channels (and therefore 9 hop frequencies). During each hop frame, the channel ID and next frequency ID are transmitted as shown in the previous figure. At the start of the minor frame, program channel 7 is on hop frequency 7, program channel 20 on frequency 20, etc. program channel 7 during hop time 1 is told to hop next to frequency 64, channel 20 during hop time 1 is told to hop next to frequency 92, etc. Therefore, instructions are present every hop regarding what is to be done next.

A listener, desiring channel 20 (for example), would select "20" on his "tuning dial". if the receiver had not previously synchronized to this hop pattern, it would select the first detectable time-frequency slot while tuned to frequency 20, and begin to follow instructions. Note that there is an 8 out of 9 chance that the program channel will not be channel 20, however this is of no consequence initially because the receiver is primarily memorizing the hop sequence. Once a consistently received hop pattern is memorized, the receiver will switch from "following instructions" to following the memorized pattern, therefore becoming immune to hop instruction errors. The switch over to the stored hop pattern occurs between the last time slot of a minor frame and the first time slot of the succeeding frame. Note that on the last time slot, all instructions agree with the channel ID. Obviously, if the listener requested program channel 20, and the last time slot instruction set indicates the receiver is not on channel 20, precise switch over can occur by switching at the end of the minor frame to the specifically requested frequency and following the memorized pattern from that point on. Additionally, the audio, which has been muted during this process is turned on now that the synchronization process is complete. The listener knew nothing about the process, and the whole synchronization cycle requires less than ten minor frames or approximately 60 milliseconds.

H. ACCOMMODATING A VARIETY OF PROGRAM CHANNEL STYLES:

Many types of programs exist to satisfy a variety of listener tastes. These program styles include "news", "talk", "rock and roll", "classical", etc. Not every broadcaster will insist on the highest fidelity channel, and wish to utilize a different capability if it can save cost. A particular feature of the digital approach described herein is that the data portion of the hop frame can be subdivided providing shared capacity and therefore lower cost. This approach is shown in FIG. 13. A full CD quality stereo channel will require all the data space on both the I and Q channels. however, it is possible to subdivide the space into 2 channels, each with the full fidelity of a monophonic CD channel, but each containing independent program material. In this case, the I channel could contain one program at 96,000 bits per second, and the Q channel a separate program also at 96,000 bits per second.

A third capability is provided that permits three independent 64,000 bits per second programs to share the data space. In this case, the I and Q channel cooperate, each providing one third of their capacity to each program.

I. DESIGN OF THE MAJOR FRAME (FIG. 14):

In the disclosed embodiment, the number of hop frames per major frame has been selected as 5040, or 30 seconds per major frame. This number is derived from the desire to 1) provide a high degree of flexibility in the number of program channels at any given stage of the transition without having to modify user receivers, and 2) provide a rapid extender resynchronization capability. Since minor frame length is variable due to the requirement to be able to implement an evolutionary transition plan, the major frame must be divisible by numerous integers to provide an integer number of minor frames per major frame. The number selected is: 1×2×2×2×2×3×3×5×7=5040. With this hop frame to major frame ratio, minor frames can incorporate any number of program channels from 1 to 16 with the exception of 11 and 13 (which will be accommodated in a different manner). While it is possible to devise a universal major frame length that will accommodate all integer program channel capabilities up to 16, the frame length would be 11×13 times as long or approximately 1 hour and 11 minutes. Since rang extender synchronization and interleaver synchronization must be maintained with a high degree of reliability, a shorter time to resynchronize is mandatory. The illustrated 30 second period computation represents a reasonable compromise.

While the framing concept will permit a variable number of frequencies (program channels) per minor frame, implementing minor frames with only a few frequencies will not permit the high channel fidelity of a higher order time frequency matrix, especially when the listener's radio is stationary. As examples, a single frequency system could "park" in a null and not be usable; a two frequency system could have every other hop in a null, providing an error block every other block. This burst error pattern is shorter than the convolutional code constraint length, and the decoder is therefore ineffective. Ideally, the number of frequencies per minor frame should exceed the coder constraint length which is "7". However, the requirement is a "soft" requirement, especially in a mobile environment. Similarly the maximum number of frequencies per minor frame is flexible, being determined more by the number of channels a power amplifier can accommodate rather than the framing structure. Frequencies in excess of 16 can easily be handled by two smaller matrices, each with 8 or more frequencies each.

J. THE INTERLEAVER FRAME:

The primary requirement of the interleaver-deinterleaver process is that its interleaving period in hop frames exceed the convolutional encoder's constraint length. Therefore the number of hop frames to be spanned is 7 as a minimum. Additionally, the interleaver span should permit an integer number of interleaver frames per major frame to permit guaranteed deinterleaver synchronization. Other design constraints are imposed for practical receiver design and these constraints dictate that 1) the interleaving period be fixed so that a fixed size deinterleave buffer can be implemented, and 2) the interleaver period be reasonably short to achieve an economic buffer size. With these constraints in mind, the number of hop frames over which the interleaving takes place has been selected as 12 providing a resynchronization epoch opportunity every second.

Figure 15:
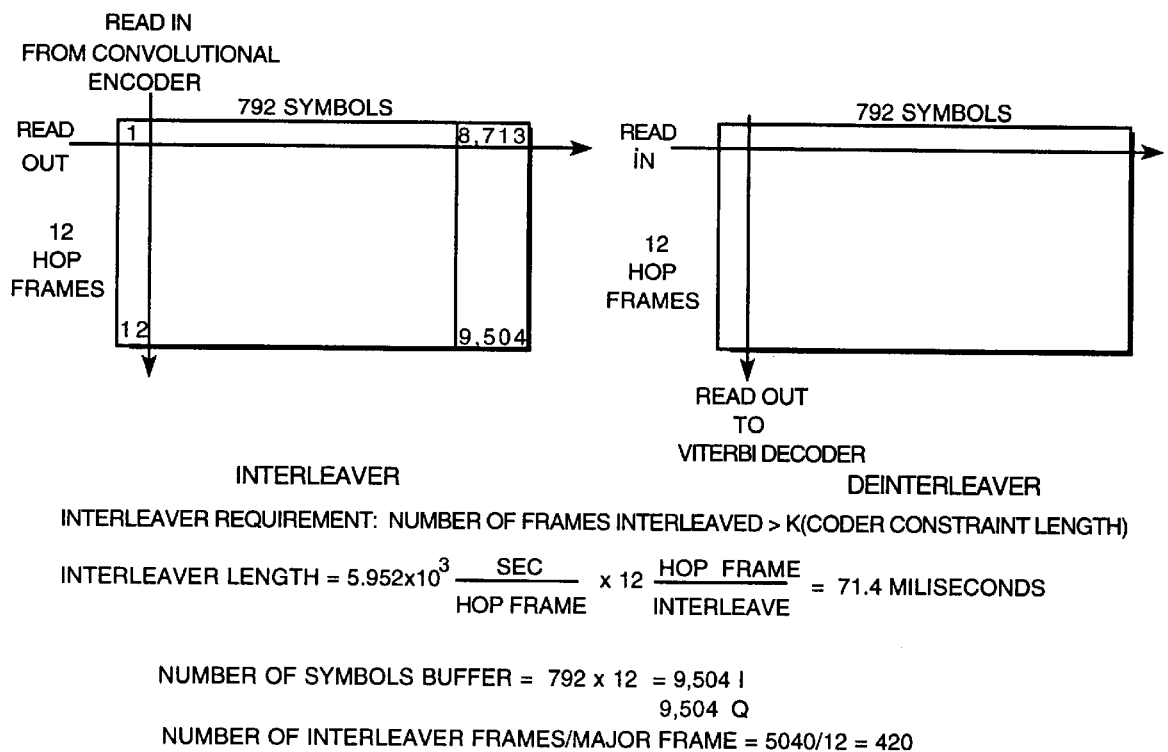
FIG. 15 is an example of the interleaver frame definitions.

FIG. 15 shows the interleaver and deinterleaver organization. Because the process provides its error redistribution process at the symbol rate, an interleaver buffer of 792 symbols (one hop frame's number of symbols per I or Q channel) by 12 (the number of hop frames to be interleaved). The convolutional encoder symbols are stored in the buffer in vertical columns, and transmitted as rows, each row being transmitted on a frequency hop. At the deinterleaver, each hop is read into the buffer as rows, and fed to the Viterbi decoder as columns. Therefore, as an example, if one frequency was in a null condition (producing a high number of symbol errors), the data to the Viterbi decoder would have an error every 12 symbols, a condition that the decoder can easily correct. The receiver's buffer size would then be slightly less than 20,000 symbols for the I and Q channels. Because one buffer is being filled while another is being emptied, twice the storage capacity is required.

II. INTEGRATION OF THE WAVEFORM WITH A DISTRIBUTED TRANSMISSION SYSTEM

Figure 1:
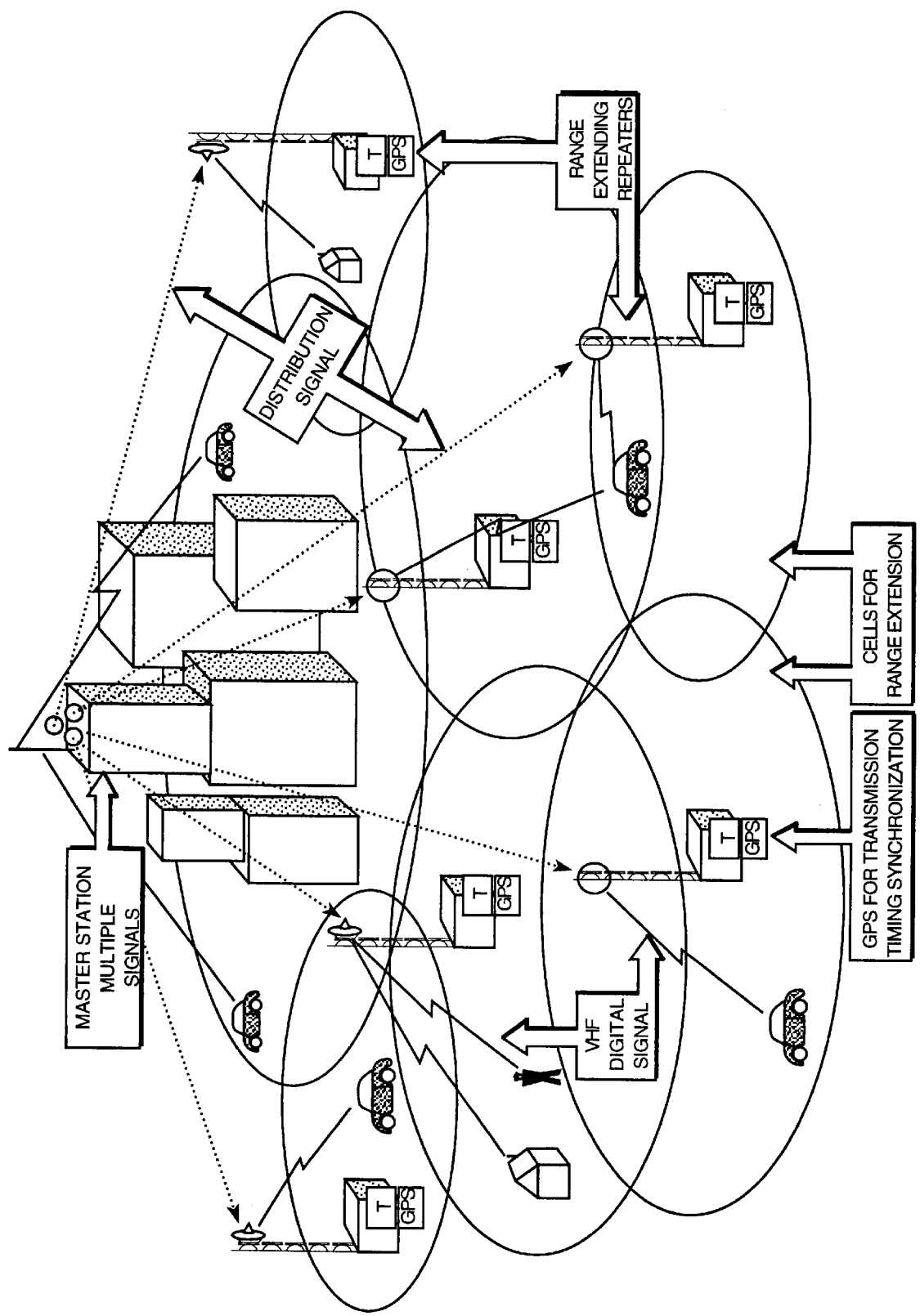
FIG. 1 is a schematic illustration of a digital broadcast system incorporating the invention.

A. THE TRANSMISSION SYSTEM:

The "waveform" that has been defined earlier herein is transmitted by the master station (FIG. 1). The transmission at this station is slightly delayed to permit forwarding of the same data to the range extension repeaters via a separate distribution system. In the preferred embodiment all transmitters (master and range extenders) transmit the same data at the same time. Precise timing is achieved by use of timing derived form the global positioning systems (GPS). GPS is preferred as the primary source of timing because of its widespread availability, extreme precision, and very low cost. The following will show the rationale for this approach to achieving the desired coverage, and integrate the transmission approach with flexible broadcasting program dissemination.

B. RANGE EXTENSION AND CONTROL:

"Brute Force" vs. Cellular Repeater Coverage
Real-time vs. Epoch Synchronized Repeaters.

Figure 16:
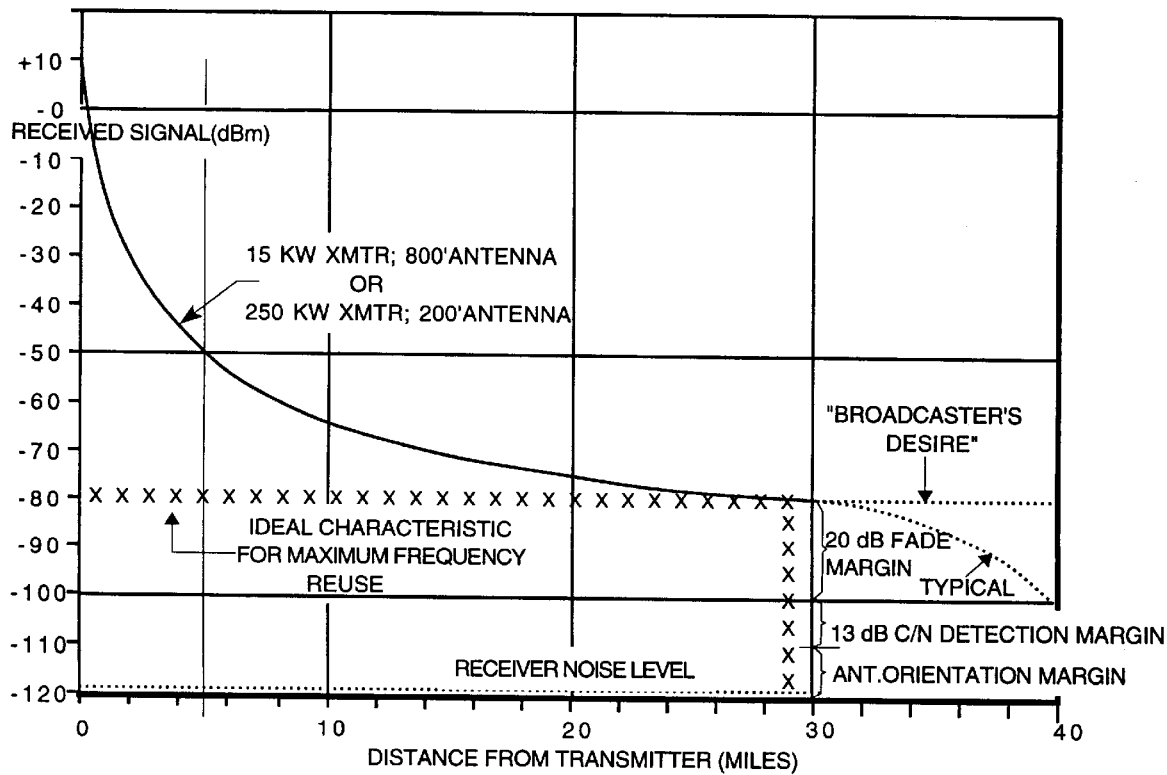
FIG. 16 illustrates the typical station implementation for 30 mile coverage (brute force)

C. THE COVERAGE ISSUE:

FIG. 16 shows the received signal strength as a function of distance from the transmitter. For this example, thirty mile coverage is shown at the 90,90 confidence level, requiring a transmitter power of 15 KW with an 800 foot antenna height. The power provided at the 30 mile point must overcome the receiver's noise power (−118 dBm), a 10 db antenna misorientation loss, the 13 dB C/N ratio required for detection, and the statistical channel variations. Note the higher power levels received at closer distances to the receiver. At the 30 mile point, the signal level falls off at a very slow rate (to the broadcaster's delight), making frequency reuse extremely difficult. Ideally, the power required would follow the minimum level (marked by X's) and stop as soon as the 30 mile point is reached so that the frequency could be reused. While this ideal coverage cannot be achieved, a much more efficient approach can be utilized using lessons learned from cellular telephony technology.

Figure 17:
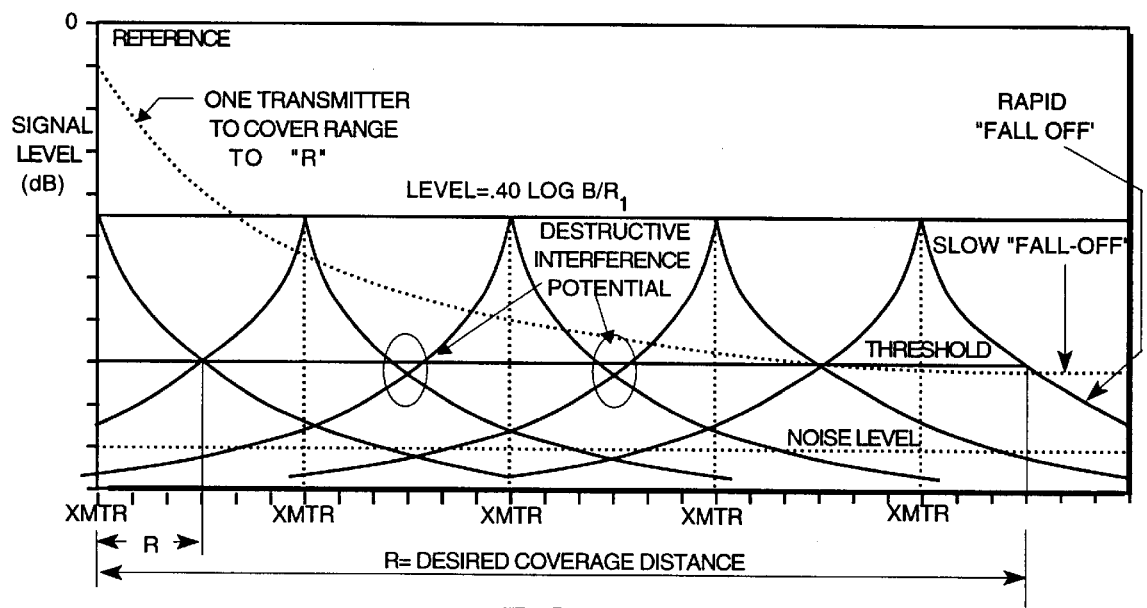
FIG. 17 illustrates the distributed or "cellular" approach to coverage according to the invention.

D. THE DISTRIBUTED TRANSMISSION CONCEPT:

FIG. 17 shows an approach to reducing the power required to achieve a given coverage. Multiple transmitters are used to cover the distance (area) each with a substantially lower power than one common transmitter. This lower power is achievable because the power distance relationship that requires the power must be increased by 16 times every time the distance doubled (40 Log(d1/d2)). For the case illustrated, this would mean a power decrease per transmitter of more than 6000 times. Note the power distribution achieved with this technique. While there are still peaks of energy near the transmitters, a substantially more uniform distribution of signal coverage is achieved. Additionally, the power drops off more rapidly beyond the desired coverage range improving frequency reuse. Thus, the advantages include:

1) Substantial savings in individual transmitter power $$\left(-40\text{LOG}\frac{R1}{R}\right)$$

2) Substantial savings in aggregate power $$\left(-20\text{LOG}\frac{R1}{R}\right)$$

and dynamic range,

3) More highly controlled coverage zone permitting improved frequency reuse.

However, the zone midway between the transmitters provides equal signal strength to the receiver, and care must be exercised in the design of both the signal and receiver to prevent this region from causing destructive self-interference.

Figure 18:
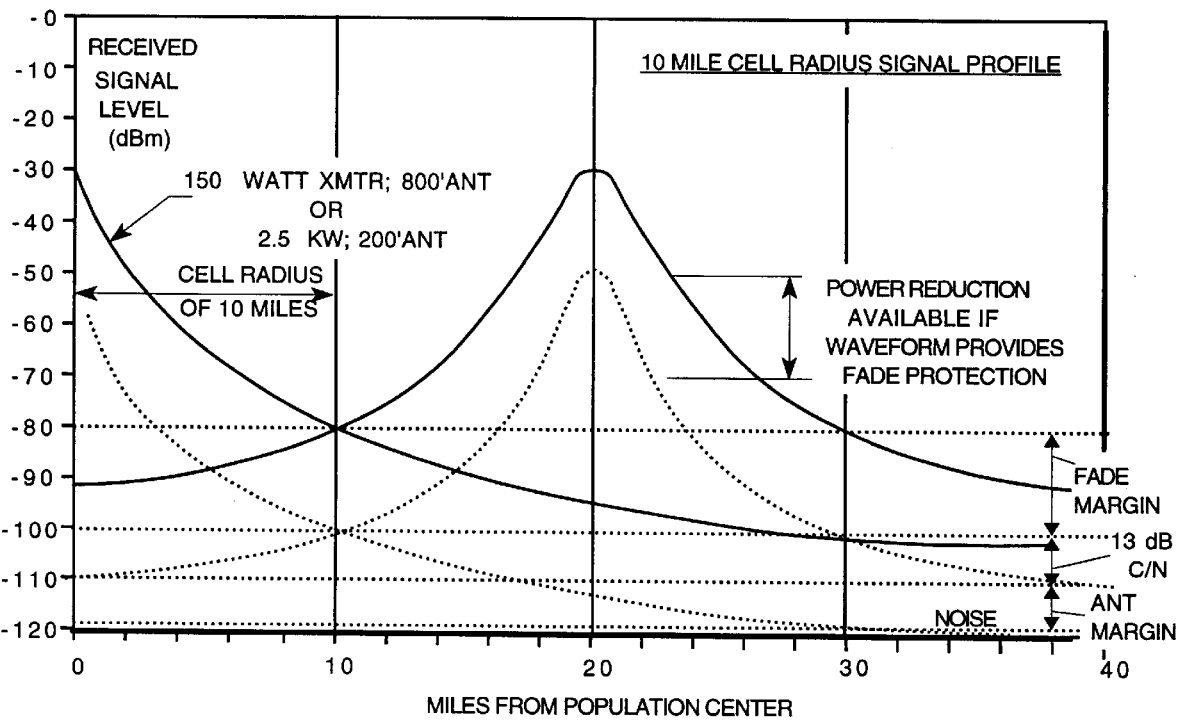
FIG. 18 illustrates the cellular range extension baseline according to the invention.

E. THE BASELINE DISTRIBUTED TRANSMISSION SYSTEM:

Referring to FIG. 18, a distribution cell radius of 10 miles has been selected in this embodiment as the baseline approach giving a coverage-per-cell of approximately 75 square miles. The first range extension repeater is then placed 20 miles from the master providing a range in the direction of the extender of 30 miles. Another repeater placed to extend the coverage distance would provide 50 miles of coverage. With this approach, the nominal power per program channel is decreased to approximately 150 watts from the 15,000 watts required with a single transmitter. Additionally, because the preferred waveform used by the DAB system disclosed herein combats the effect of multipath fading, it is anticipated that much of the 20 dB fade margin may be available to further reduce the transmitter power of the DAB signal.

F. SEAMLESS ZONE TRANSITION APPROACH:

FIG. 18 shows a zone approximately one-half the distance from either transmitter that has the potential for self-interference. In this DAB approach, the power from the two transmitters is used constructively to improve, not degrade performance in the zone. In an earlier description herein of the range extension technique, it was identified that the broadcast from the master was delayed so that all transmitters transmit the same data at the same time. The diagram on the left in FIG. 18 shows the problem if the transmissions are simply relayed without delay. The signal's paths to the receiver in the seam is highly delayed for the relayed signals, resulting in a wide time separation in received data. While an adaptive equalizer can separate these signals, the adaptive equalizer must be longer in data delay (symbols) than the actual delay paths, making the device very expensive for consumer applications. With the delayed transmission approach of this DAB system (see the right side of FIG. 19 diagram), the delays are nearly equal to the receiver, making the equalizer's task fairly simple.

There are obviously other regions between the transmitters where the signal paths to the receiver will be quite unequal in time, however, for these cases there is a substantial power advantage to the closest transmitter which deweights the effect of the more distant transmitter. This effect is guaranteed by spacing the transmitters (repeaters) closely to insure that the signal strength in crossover region has a rapid fall-off as a function of distance. This is achieved with the baseline approach (see FIG. 18).

Figure 20:
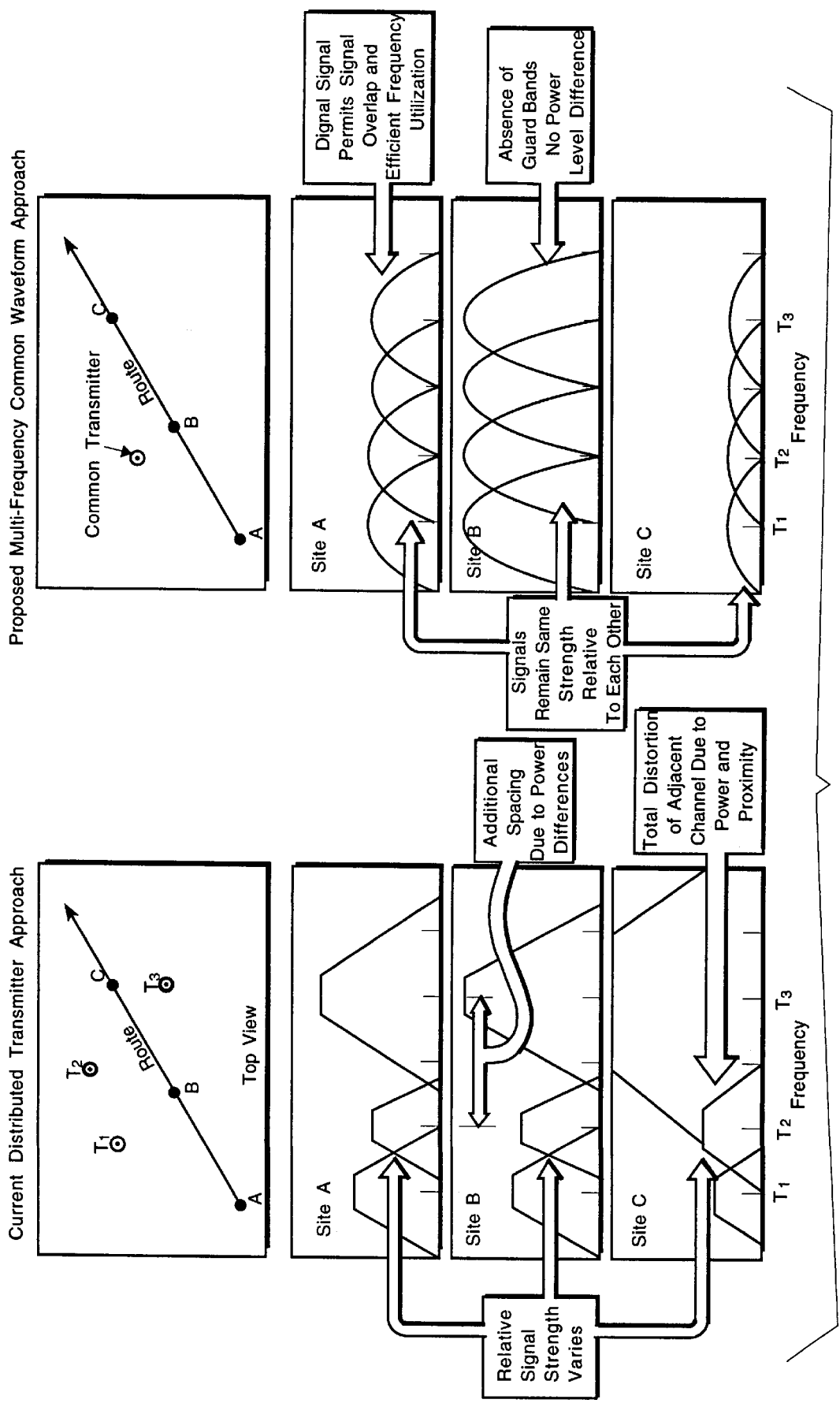

G. DYNAMIC RANGE AND BANDWIDTH EFFICIENCY IMPROVEMENT (FIG. 20):

The current broadcast concept, whether it be for AM, FM, or TV, tends to radiate one signal per transmitter (disregarding a few instances of cooperation when very high structures are used). These transmitters also tend to be distributed on the highest structures and/or antenna towers wherever the appropriate real estate can be acquired. With this distribution, the signal strength of the various stations relative to each other is highly dependent on where the listener's radio is relative to the station. As a result, severe dynamic range problems can occur if the listener is tuned to a weak station while being physically close to a different station. This effect is depicted in the left set of diagrams in FIG. 20. As a result, very powerful FM stations are forced to have at least one channel of guard space to prevent this overloading, resulting in poor bandwidth efficiency. The DAB transmission process of this invention coupled with the multiple program-per-waveform approach significantly improves the dynamic range issue. Because multiple signals are radiated from a transmitter, all of the signals have the same power relative to each other regardless of the listener's physical distance from the transmitter. See the right set of diagrams in FIG. 20. Since the receiver is no longer forced to cope with the extreme power differences between signals, the signals can be placed close together in frequency, requiring no special guardband considerations, thereby maintaining the design channels/Hz.

III. AN EXAMPLE AREA IMPLEMENTATION PLAN USING THE WASHINGTON/BALTIMORE STATISTICAL METROPOLITAN AREA

Figure 21:
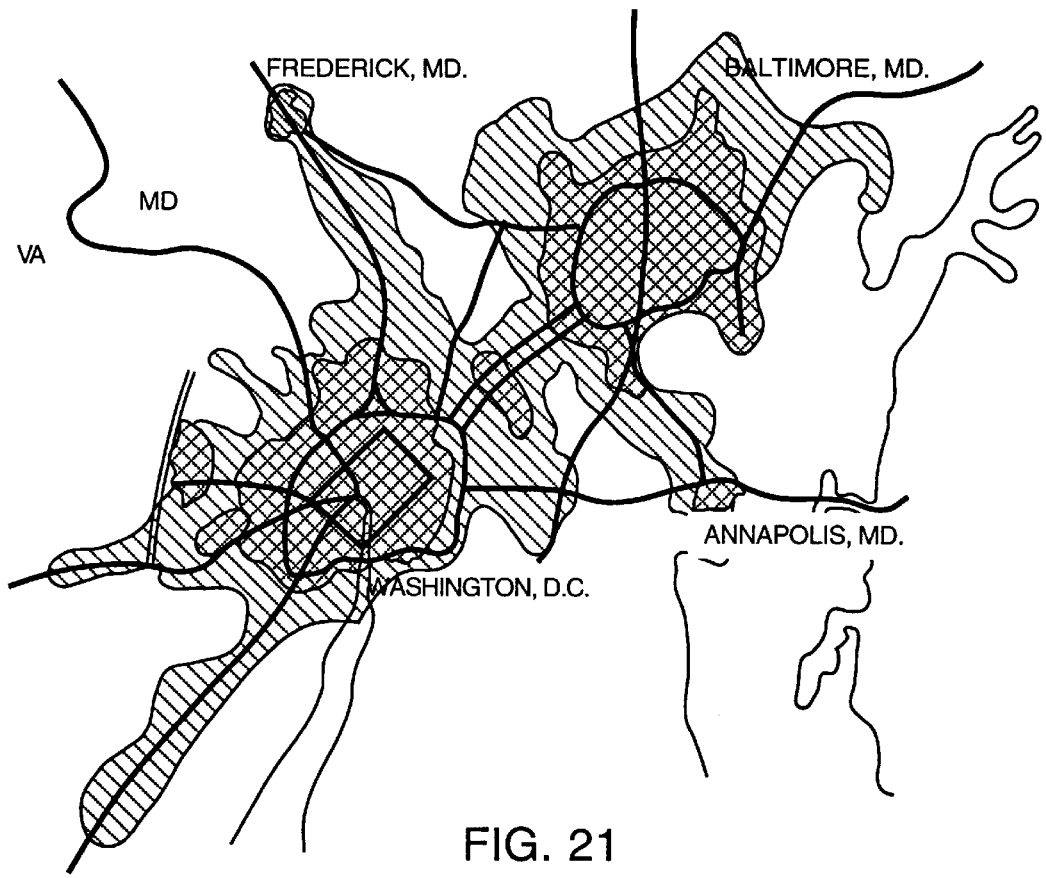
FIG. 21 is a map showing the population density of a typical metropolitan area such as Washington, DC—Baltimore, Md. and extensions to Frederick and Annapolis, Md.

A. THE STATISTICAL METROPOLITAN AREA:

FIG. 21 shows the population density of the Washington/Baltimore Statistical Metropolitan Area (SMA). The two primary areas of Washington, DC and Baltimore, because of their proximity, must be considered as one unit in the assignment of frequencies because high power transmitters are used, with each area achieving marginal reception of some signals in the other's area. This SMA will be used to show how common coverage and unique local coverage can be simultaneously achieved.

Figure 22:
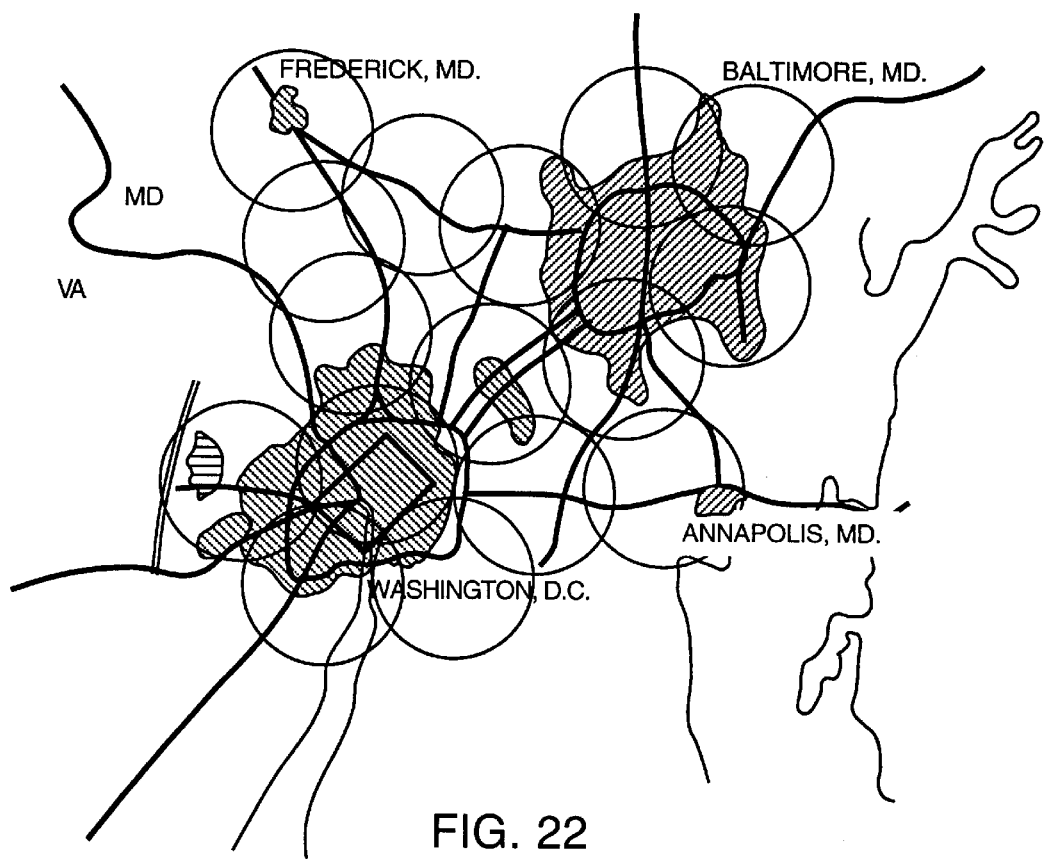
FIG. 22 is a map showing an example of the coverage.

B. A COVERAGE PLAN:

The use of distributed transmission techniques permits the planner to select very specific areas of coverage to match population densities with coverage. The first order priority in the placement plan is to insure complete coverage of the primary cities in the region, and then to fill in areas of population extension. The circles on FIG. 22 represent the distributed transmission areas for this example.

Figure 23:
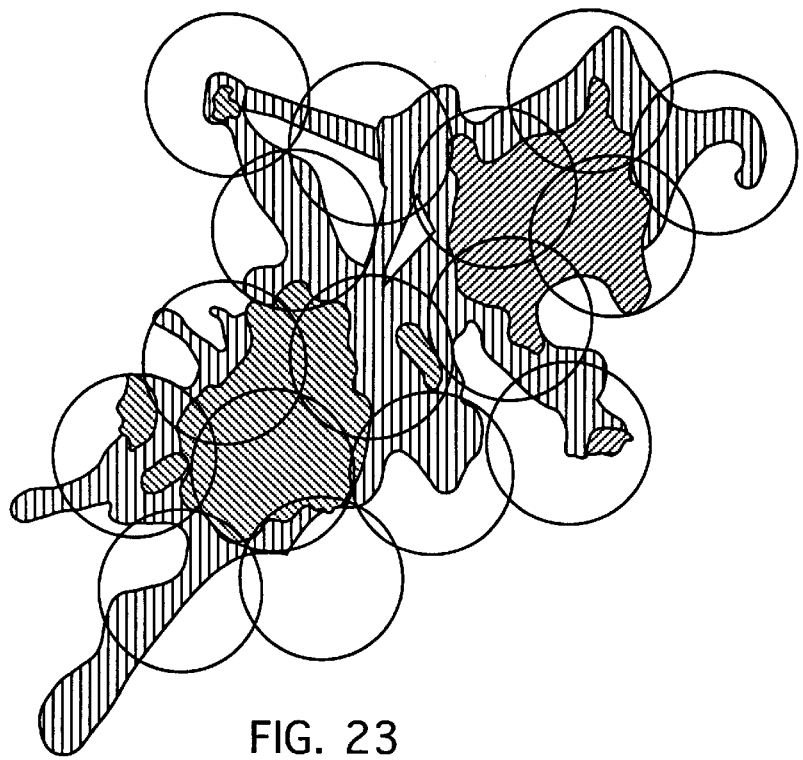
FIG. 23 is a map illustrating the coverage effectiveness for the map of FIG. 21.

C. COVERAGE EFFECTIVENESS:

FIG. 23 shows how the specific population densities are served by the distributed transmission approach. For this portion of the example, this diagram shows what regions can be reached with common program material. It also shows that the tailoring is effective, wasting very little of the resources on low population densities.

D. LOCAL PROGRAMMING COVERAGE:

It is also possible with the transmission approach described to provide unique local broadcasting to achieve coverage with program material of interest to a much smaller geographic group. The approach to be described is especially aided with the distributed transmission approach because of the lower power transmitters employed permitting frequent frequency reuse.

Figure 24:
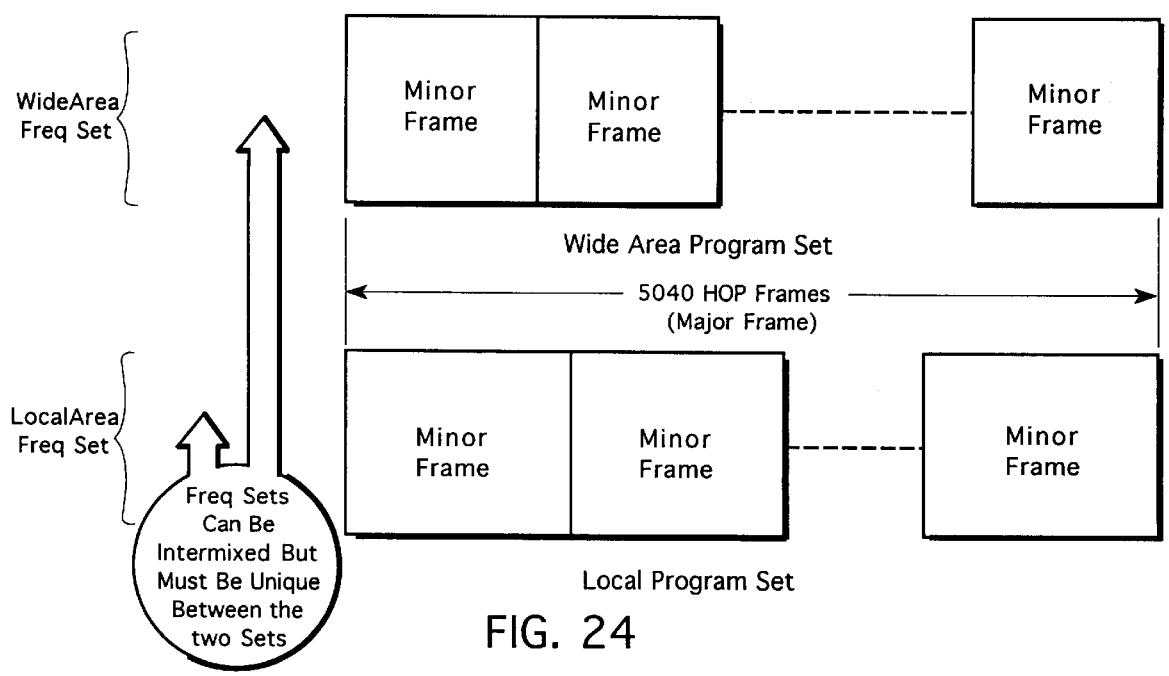
FIG. 24 is an example of flexible use wide area broadcast with local area broadcast.

FIG. 24 shows two time-frequency matrices each with a different minor frame length. For purposes of this example, the upper matrix represents the "common programming" distribution that has previously been described. The lower matrix represents the matrix to be used for local broadcasting in the statistical metropolitan area. Both the wide area and local programming matrices can exist at the same time, however, each must have a unique set of frequencies. For this example, it will be assumed that the local matrix has a frequency allocation of 16 frequencies.

Figure 25:
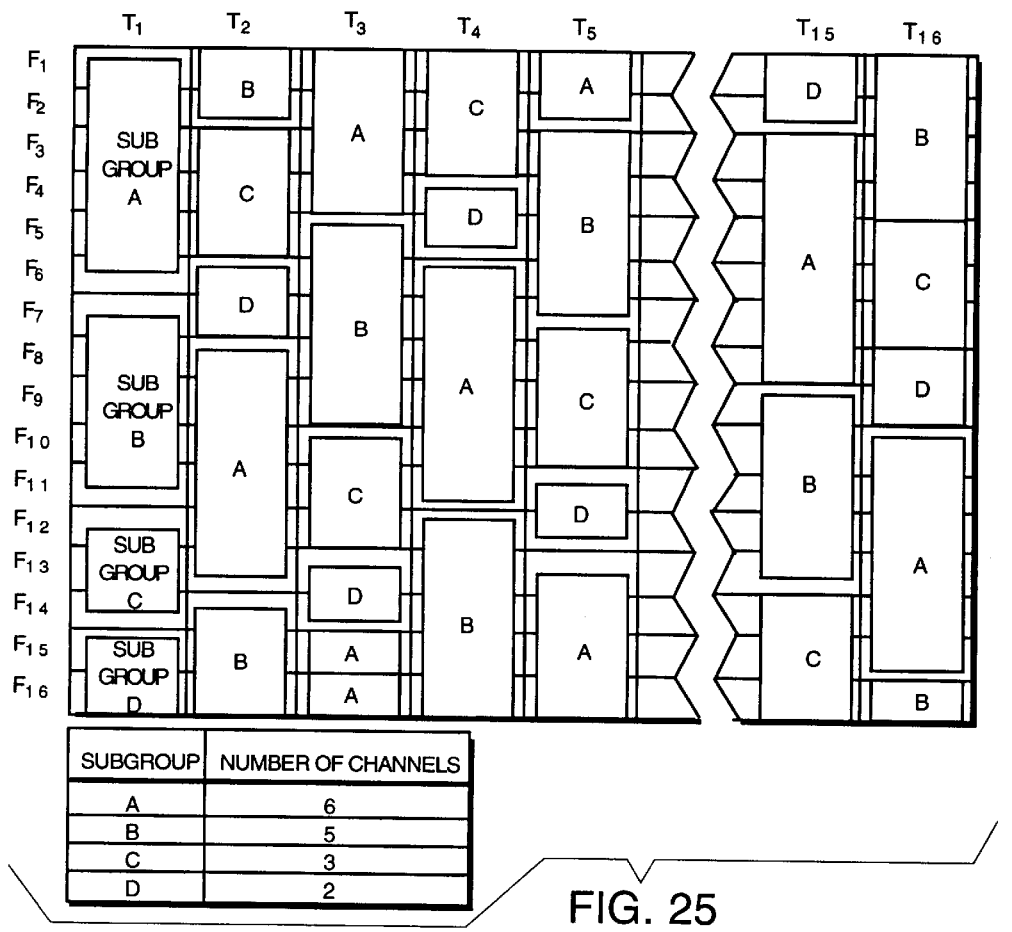
FIG. 25 is a diagram illustrating waveform allocation.

E. ALLOCATING THE "LOCAL" WAVEFORM:

The local waveform is shown in FIG. 25. The frequency space has been arbitrarily allocated to four subgroups as shown, each subgroup having a different number of channels dictated by area need. Note that the subgroups hop "in synchronism" just as if they were a single program (each program channel hops independently as before i.e., the listener's radio is no different than if the signal were a wide area signal).

Figure 26:
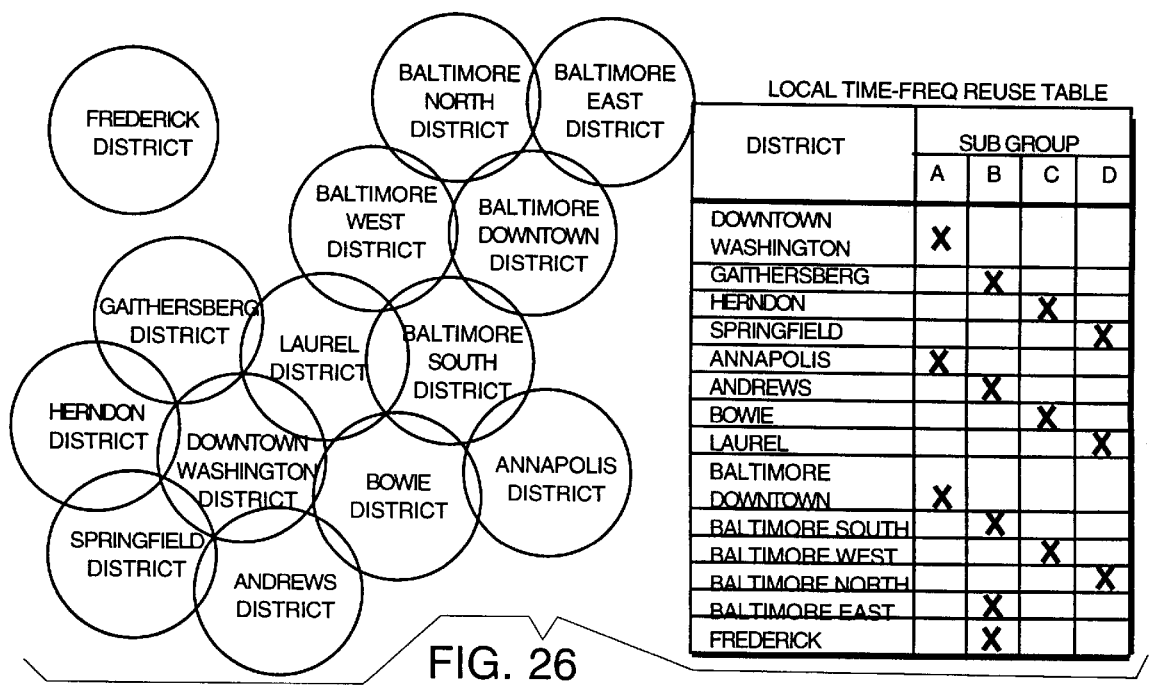
FIG. 26 is an example of local broadcast spatial time-frequency subgroup reuse for Washington, DC—Baltimore, Md. area shown in FIG. 21.

F. DISTRIBUTING THE LOCAL PROGRAMMING:

The Washington, DC coverage diagram used earlier is shown in FIG. 26. The same coverage is shown because the wide area and local area transmission facilities are likely to be the same, and depending on antenna height of the area, may use common transmitter power amplifiers. The areas of coverage have been given names relative to the general region they serve. The matrix subgroups have then been allocated to these "districts" for use for local broadcasting. Note that all districts share some of the matrix with other districts. This is achievable because no two of the districts with the same frequency set (subgroup) are next to each other geographically. The low power transmission approach permits this reuse because the power from an alternate cell is near the noise level in the reuse cell. Since 14 districts have on average 4 program channels each, a total of 56 program channels is possible (in this example) with only a 16 frequency matrix for local use.

IV TRANSMISSION SYSTEM

Figure 27:
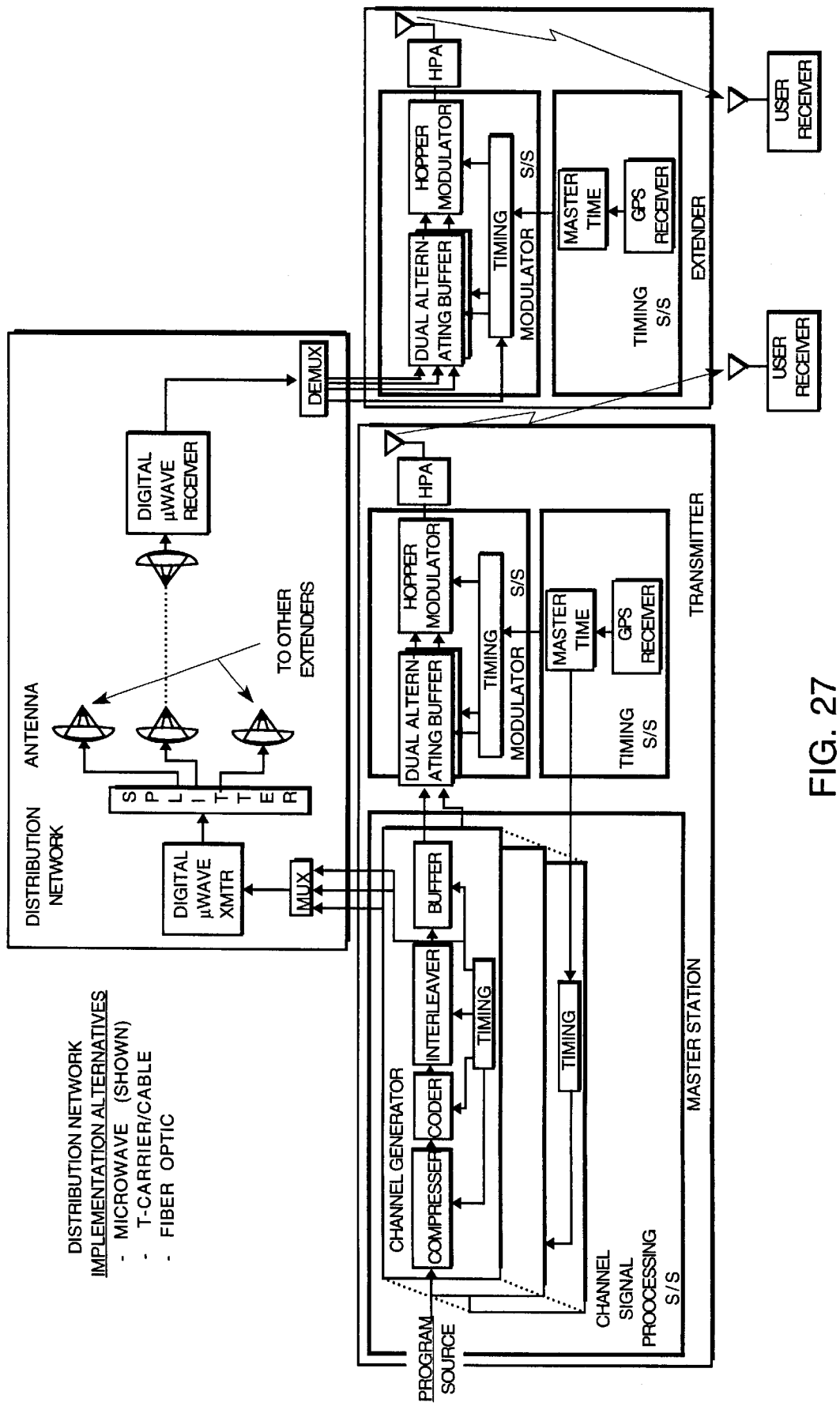
FIG. 27 is a schematic block diagram of the system showing the master station and transmitter and distribution network to extender stations and to user receiver.

FIG. 27 shows the transmission system including the master station, an example distribution network, a range extension repeater, and the user's (listener's) receiver. The program material is processed through the channel processor and stored in interleaved form in a buffer. This data is directed to two locations, 1) the range extension repeater, and 2) the master modulator. The output sections of the master station and the range extender are identical each equipped with dual alternating buffers which alternately accept and then transmit the interleaved data. The hopper modulator acts on each program channel's data independently to produce a phase continuous frequency hopped signal. The data is "released" for transmission based on hop frame epochs developed by the local timing subsystem precisely coordinated by GPS time.

The distribution system shown is a microwave system that multiplexes the interleaver data for transmission to all of the range extension repeaters. One outbound microwave channel serves all wide area range extension repeaters. However, microwave is not the only distribution system that can be used. As discussed earlier, wideband fiber optic links, and telco T-carrier links are equally as applicable.

V THE CONSUMER RADIO

Figure 28:
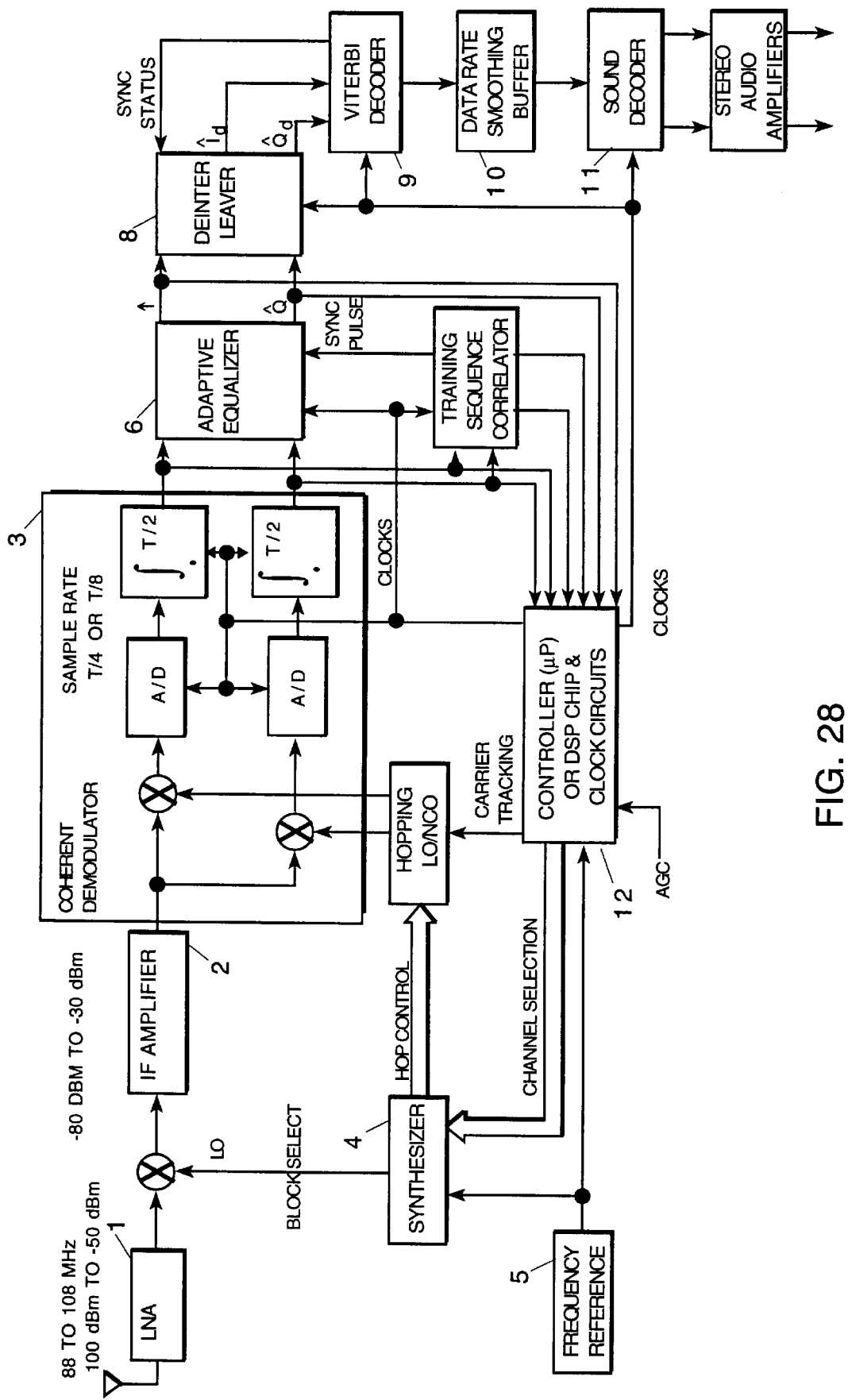
FIG. 28 is a schematic block diagram of DAB receiver of the type disclose din the above-identified application.

The receiver block diagram for the VHF DAB system is shown in FIG. 28 which is described in greater detail in the above-identified application. This architecture has been designed to maximize the digital implementation thereby reducing cost to manufacture. The analog components include the low noise amplifier (LNA), mixer, frequency reference, the IF amplifier, and the audio amplifiers. All other elements of the diagram shown in FIG. 28 are digitally implemented. All of the components of the receiver are current technology.

SUMMARY SYSTEM FEATURES

1) Digital transmission of CD quality programming.
2) Effective avoidance of multipath effects to prevent degradation of CD quality through the use of a spread-spectrum waveform.
3) Effective use of multipath used in time diversity combining via an adaptive equalizer.
4) Interference reduction through the use of the spread-spectrum waveform.
5) Significant transmitter power reduction through the use of a distributed transmission concept.
6) Reduction of signal dynamic range caused by spatial transmitter locations.
7) Flexible frequency utilization plan permits simple transition into FM band permitting shared use of the band.
8) User friendly, requires no special consumer talents.
9) Variable capacity channels provided to suit different program styles.
10) Coverage tailored to population densities.
11) Compatible wide area and local area programming capability.

While the preferred embodiment of the invention is illustrated as being applied to audio, it will be appreciated that the broader aspects of the invention are not limited to digital audio broadcasts and various modifications and adaptations of the invention will be readily apparent to those skilled in the art.

What is claimed is:

1. A digital audio broadcast (DAB) system, comprising:
   a master DAB radio broadcast station located at a main predetermined terrestrial location for formatting and broadcasting a plurality of channels of digitized program data in a spread spectrum, time and frequency hopping waveform to remote mobile and stationary receivers,
   a plurality of relatively low power DAB range extension radio broadcast stations, each said range extension DAB station being located in respective terrestrial areas having selected population densities and each range extension DAB station having means to receive and store (delay) one or more channels of program information from said master DAB station,
   a separate program distribution system coupling said means to receive and store at each of said range extension DAB radio broadcast station with said master DAB radio broadcast station, and
   means to synchronize channels of digital data re-broadcast from each of said range extension DAB radio broadcast stations with broadcasts from said master DAB radio broadcast station such that a mobile receiver traveling between edges of reception of two or more low power range extension DAB radio broadcast stations does not evidence interference therebetween.

2. The digital audio broadcast system defined in claim 1 wherein said means to synchronize includes a global satellite timing system at each said broadcast station.

3. The digital audio broadcast (DAB) system defined in claim 1 including digital data compression means in each said broadcast station for compressing said program data and achieve bandwidth reduction, multipath inter-symbol reduction, and margin improvement.

4. The digital audio broadcast system defined in one of claims 1, 2 or 3 wherein each said broadcast system includes convolution encoder means, and each said receiver includes a Viterbi decoder to provide error correction and margin improvement.

5. The digital audio broadcast system defined in claim 3 wherein each said broadcast station includes a frame interleaver and each said receiver includes a frame deinterleaver for error statistic control.

6. The digital audio broadcast system defined in claim 3 wherein each said broadcast station includes means to provide a training control header on each frame of data and each said receiver includes an adaptive equalizer controlled by said header for reducing multi-path inter-symbol interference in between broadcast station signals at said receiver.

7. The digital audio broadcast system defined in claim 3 wherein each said broadcast station includes frequency hopping means for each channel of program data for hopping program data over a bandwidth a predetermined interval.

8. The digital audio broadcast system defined in claim 3 wherein each said broadcast station includes an RF modulator for modulating said program data on an RF signal, said RF modulator including modulation means based on quadrature (I,Q) phase shift keying.

9. The digital audio broadcast system defined in claim 1 wherein said distribution system for each range extension station includes at least one path selected from satellite, microwave, fiber-optic, coaxial cable and telephone paths, for coupling one or more channels of program information to each range extension station.

10. A digital audio broadcast (DAB) system, comprising:
    a master DAB radio broadcast station located at a main predetermined location for formatting and broadcasting a plurality of channels of digitized program data to remote mobile and stationary receivers,
    a plurality of relatively low power DAB range extension radio broadcast stations, each said range extension DAB station being located in respective areas having selected population densities and each range extension DAB station having means to receive and store one or more channels of program information from said master DAB station,
    a separate digitized program information distribution system coupling said means to receive and store at each of said range extension DAB radio broadcast station with said master DAB radio broadcast station, said separate distribution system, including, for each range extension station at least one path selected from microwave, fiber-optic and telephone paths, for coupling one or more channels of program information to each range extension station,
    satellite timing means at each range extension station to synchronize channels of digital data re-broadcast from each of said range extension DAB radio broadcast stations with broadcasts from said master DAB radio broadcast station such that a mobile receiver traveling between edges of reception of two or more low power range extension DAB radio broadcast stations does not evidence interference therebetween, and
    each said broadcast station including digital compression means coupled to said distribution system for compressing said program data, convolution encoder means for convolution encoding said program data, frame interleaver means connected to said convolution encoder for interleaving frames of program data, means connected to said frame interleaver for providing a training control header on each frame of program data and frequency hopping means for each channel of program data.

11. A digit al broadcast system, comprising:

a master radio broadcast station located at a main predetermined location for formatting and broadcasting a plurality of channels of digitized program data in a spread spectrum, time and frequency hopping waveform to remote mobile and stationary receivers, a plurality of relatively low power range extension radio broadcast stations, each said range extension station being located in selected areas and each range extension station having means to receive and store one or more channels of program information from said master station, a separate program distribution system coupling said means to receive and store at each of said range extension radio broadcast station with said master radio broadcast station, said separate distribution system, including, for each range extension station at least one path selected from satellite, microwave, fiber-optic, coaxial cable and telephone paths, for coupling one or more channels of program information to each range extension station, and means to synchronize the channels of digital data re-broadcast from each of said range extension radio broadcast stations with broadcasts from said master radio broadcast station such that a mobile receiver traveling between edges of reception of two or more low power range extension radio broadcast stations does not evidence interference therebetween.

12. The digital broadcast system defined in claim 11 wherein said means to synchronize includes a global satellite timing system at each said broadcast station.

13. The digital broadcast system defined in claim 11 including digital data compression means in each said broadcast station for compressing said program data and achieve bandwidth reduction, multipath inter-symbol reduction, and margin improvement.

14. The digital broadcast system defined in one of claims 11, 12 or 13 wherein each said broadcast system includes convolution encoder means, and each said receiver includes a viterbi decoder to provide error correction and margin improvement.

15. The digital broadcast system defined in claim 13 wherein each said broadcast station incudes a frame interleaver and each said receiver includes a frame deinterleaver for error statistic control.

16. The digital broadcast system defined in claim 13 wherein each said broadcast station includes means to provide a training control header on each frame of data and each said receiver includes an adaptive equalizer controlled by said header for reducing multi-path inter-symbol interference in between broadcast station signals at said receiver.

17. The digital broadcast system defined in claim 13 wherein each said broadcast station includes frequency hopping means for each channel of program data for hopping program data over a bandwidth a predetermined interval.

18. The digital broadcast system defined in claim 13 wherein each said broadcast station includes an RF modulator for modulating said program data on an RF signal, said RF modulator including modulation means based on quadrature (I,Q) phase shift keying.

19. A digital broadcast system comprising at least one radio broadcast station having means for formatting a plurality of channels of digitized program data and means for broadcasting said channels of digitized program data in a spread spectrum waveform.

20. The digital broadcast system defined in claim 19 including digital data compression means in said broadcast station for compressing said program data and achieve bandwidth reduction, multipath inter-symbol reduction, and margin improvement.

21. The digital broadcast system defined in claim 19 wherein said broadcast system includes means for imposing a forward error correction code on said digitized program data.

22. The digital broadcast system defined in claim 20 wherein said broadcast system includes convolution encoder means, and each said receiver includes a Viterbi decoder to provide error correction and margin improvement.

23. The digital broadcast system defined in claim 20 wherein each said broadcast station incudes a frame interleaver and each said receiver includes a frame deinterleaver for error statistic control.

24. The digital broadcast system defined in claim 20 wherein said broadcast station includes means to provide a training control header on each frame of data and each said receiver includes an adaptive equalizer controlled by said header for reducing multi-path inter-symbol interference in between broadcast station signals at said receiver.

25. The digital broadcast system defined in claim 20 wherein each said broadcast station includes frequency hopping means for each channel of program data for hopping program data over a bandwidth a predetermined interval.

26. The digital broadcast system defined in claim 20 wherein each said broadcast station includes an RF modulator for modulating said program data on an RF signal, said RF modulator including modulation means based on quadrature (I,Q) phase shift keying.

* * * * *